US007006555B1

(12) United States Patent
Srinivasan

(10) Patent No.: US 7,006,555 B1
(45) **Date of Patent: *Feb. 28, 2006**

(54) SPECTRAL AUDIO ENCODING

(75) Inventor: Venugopal Srinivasan, Palm Harbor, FL (US)

(73) Assignee: Nielsen Media Research, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/428,425

(22) Filed: Oct. 27, 1999

Related U.S. Application Data

(63) Continuation-in-part of application No. 09/116,397, filed on Jul. 16, 1998, now Pat. No. 6,272,176.

(51) Int. Cl.
*H04B 1/713* (2006.01)
*H04L 9/00* (2006.01)
*H04H 9/00* (2006.01)
*H04N 7/16* (2006.01)

(52) U.S. Cl. ...................... 375/133; 375/135; 375/136; 380/42; 380/253; 725/18

(58) Field of Classification Search ................ 375/132, 375/133, 135, 136, 240; 380/252, 253, 42, 380/254; 725/18
See application file for complete search history.

(56) References Cited

U.S. PATENT DOCUMENTS

| | | | | |
|---|---|---|---|---|
| 2,573,279 | A | 10/1951 | Scherbatskoy | 346/37 |
| 2,630,525 | A | 3/1953 | Tomberlin et al. | 250/6 |
| 2,766,374 | A | 10/1956 | Hoffmann | 250/2 |
| 3,004,104 | A | 10/1961 | Hembrooke | 179/2 |
| 3,492,577 | A | 1/1970 | Reiter et al. | 325/31 |
| 3,684,838 | A | 8/1972 | Kahn | 704/227 |
| 3,760,275 | A | 9/1973 | Ohsawa et al. | 325/31 |
| 3,845,391 | A | 10/1974 | Crosby | 325/64 |
| 4,025,851 | A | 5/1977 | Haselwood et al. | 325/31 |
| 4,225,967 | A | 9/1980 | Miwa et al. | 455/68 |
| 4,238,849 | A | 12/1980 | Gassmann | 370/11 |
| 4,313,197 | A | 1/1982 | Maxemchuk | 370/111 |
| 4,425,642 | A | 1/1984 | Moses et al. | 370/76 |

(Continued)

FOREIGN PATENT DOCUMENTS

DE 43 16 297 4/1994

(Continued)

OTHER PUBLICATIONS

International Search Report in PCT/US00/03829 dated Aug. 18, 2000.

(Continued)

*Primary Examiner*—Khai Tran
*Assistant Examiner*—David B. Lugo
(74) *Attorney, Agent, or Firm*—Hanley, Flight & Zimmerman LLC

(57) ABSTRACT

Blocks of audio are encoded based upon corresponding first and second frequencies. The first and second frequencies are hopped from block to block. An audio quality measure (AQM) is computed for each block of audio such that, if x out of y blocks of audio have an AQM greater than a first predetermined threshold, encoding is suspended. For example, x may be nine and y may be 16. Also, if a ratio of the energy in a front part of a block of audio to the energy in a rear part of the block of audio is greater than a second predetermined threshold, that block of audio is not encoded even though x out of y blocks of audio have an AQM greater than the first predetermined threshold. Multiple distributors of the audio may encode the audio with their corresponding identities using the above processes.

43 Claims, 13 Drawing Sheets

U.S. PATENT DOCUMENTS

| | | | | |
|---|---|---|---|---|
| 4,512,013 A | | 4/1985 | Nash et al. | 370/69.1 |
| 4,523,311 A | | 6/1985 | Lee et al. | 370/69.1 |
| 4,677,466 A | | 6/1987 | Lert, Jr. et al. | 358/84 |
| 4,697,209 A | | 9/1987 | Kiewit et al. | 358/84 |
| 4,703,476 A | | 10/1987 | Howard | 370/76 |
| 4,750,173 A | | 6/1988 | Blüthgen | 370/111 |
| 4,771,455 A | | 9/1988 | Hareyama et al. | 380/6 |
| 4,876,617 A | | 10/1989 | Best et al. | 360/60 |
| 4,931,871 A | | 6/1990 | Kramer | 358/142 |
| 4,943,973 A | | 7/1990 | Werner | 375/1 |
| 4,945,412 A | | 7/1990 | Kramer | 358/142 |
| 4,972,471 A | | 11/1990 | Gross et al. | 380/3 |
| 5,113,437 A | | 5/1992 | Best et al. | 380/3 |
| 5,212,551 A | | 5/1993 | Conanan | 348/484 |
| 5,213,337 A | | 5/1993 | Sherman | 273/439 |
| 5,319,735 A | | 6/1994 | Preuss et al. | 395/2.14 |
| 5,379,345 A | | 1/1995 | Greenberg | 380/23 |
| 5,394,274 A | | 2/1995 | Kahn | 360/27 |
| 5,404,377 A | | 4/1995 | Moses | 375/200 |
| 5,425,100 A | * | 6/1995 | Thomas et al. | 725/20 |
| 5,450,490 A | | 9/1995 | Jensen et al. | 380/6 |
| 5,473,631 A | | 12/1995 | Moses | 375/202 |
| 5,574,962 A | | 11/1996 | Fardeau et al. | 455/2 |
| 5,579,124 A | | 11/1996 | Aijala et al. | 386/96 |
| 5,581,800 A | | 12/1996 | Fardeau et al. | 455/2 |
| 5,594,934 A | | 1/1997 | Lu et al. | 455/2 |
| 5,612,943 A | | 3/1997 | Moses et al. | 369/124.09 |
| 5,629,739 A | | 5/1997 | Dougherty | 348/486 |
| 5,687,191 A | | 11/1997 | Lee et al. | 375/216 |
| 5,748,763 A | | 5/1998 | Rhoads | 382/115 |
| 5,764,763 A | | 6/1998 | Jensen et al. | 380/6 |
| 5,768,426 A | | 6/1998 | Rhoads | 382/232 |
| 5,774,452 A | | 6/1998 | Wolosewicz | 370/212 |
| 5,787,334 A | | 7/1998 | Fardeau et al. | 455/2 |
| 5,822,360 A | | 10/1998 | Lee et al. | 375/200 |
| 5,832,119 A | | 11/1998 | Rhoads | 382/232 |
| 5,850,481 A | | 12/1998 | Rhoads | 382/232 |
| 5,930,369 A | | 7/1999 | Cox et al. | 380/54 |
| 6,026,193 A | | 2/2000 | Rhoads | 382/232 |
| 6,035,177 A | | 3/2000 | Moses et al. | 455/2 |
| 6,151,578 A | | 11/2000 | Bourcet et al. | 704/500 |
| 6,175,627 B1 | * | 1/2001 | Petrovic et al. | 380/42 |
| 6,272,176 B1 | * | 8/2001 | Srinivasan | 375/240 |
| 6,308,150 B1 | | 10/2001 | Neo et al. | 704/200.1 |
| 6,421,445 B1 | | 7/2002 | Jensen et al. | 380/253 |
| 6,427,012 B1 | | 7/2002 | Petrovic | 380/238 |
| 6,512,796 B1 | | 1/2003 | Sherwood | 375/242 |
| 6,571,144 B1 | | 5/2003 | Moses et al. | 700/94 |
| 6,584,138 B1 | | 6/2003 | Neubauer et al. | 375/130 |
| 6,799,164 B1 | | 9/2004 | Araki | 704/500 |

FOREIGN PATENT DOCUMENTS

| | | |
|---|---|---|
| EP | 0 243 561 | 11/1987 |
| EP | 0 535 893 | 4/1993 |
| GB | 2 170 080 | 7/1986 |
| GB | 2 260 246 | 7/1993 |
| GB | 2 292 506 | 2/1996 |
| JP | 07 059030 | 3/1995 |
| JP | 7059030 | 3/1995 |
| JP | 09 009213 | 10/1997 |
| WO | WO 89/09985 | 10/1989 |
| WO | WO 93/07689 | 4/1993 |
| WO | WO 94/11989 | 5/1994 |
| WO | WO 00/04662 | 1/2000 |

OTHER PUBLICATIONS

"Digital Audio Watermarking," Audio Media, Jan./Feb. 1998, pp. 56, 57, 59, and 61.

International Search Report, dated Aug. 27, 1999, Application No. PCT/US98/23558.

Namba, S. et al., "A Program Identification Code Transmission System Using Low-Frequency Audio Signals," NHK Laboratories Note, Ser. No. 314, Mar. 1985.

Steele, R. et al., "Simultaneous Transmission of Speech and Data Using Code-Breaking Techniques," The Bell System Tech. Jour., vol. 60, No. 9, pp. 2081-2105, Nov. 1981.

* cited by examiner

SPECTRAL AUDIO ENCODING

RELATED APPLICATION

This application is a continuation-in-part of U.S. patent application Ser. No. 09/116,397 filed Jul. 16, 1998, now issued as U.S. Pat. No. 6,272,176. This application also contains disclosure similar to the disclosure in U.S. patent application Ser. No. 09/427,970.

TECHNICAL FIELD OF THE INVENTION

The present invention relates to spectral audio encoding useful, for example, in modulating broadcast signals in order to add identifying codes thereto.

BACKGROUND OF THE INVENTION

Several approaches to metering the video and/or audio tuned by television and/or radio receivers in order to determine the sources or identities of corresponding television or radio programs are known. For example, one approach is to real time correlate a program to which a receiver is tuned with each of the programs available to the receiver. An apparatus useful for this measurement approach is found in the teachings of Lu et al. in U.S. Pat. No. 5,594,934.

Another approach is to extract a characteristic signature (or a characteristic signature set) from the program selected for viewing and/or listening, and to compare the characteristic signature (or characteristic signature set) with reference signatures (or reference signature sets) collected from known transmission sources at a reference site. Although the reference site could be the viewer's household, the reference site is usually at a location which is remote from the households of all of the viewers being monitored. Systems using signature extraction are taught by Lert and Lu in U.S. Pat. No. 4,677,466 and by Kiewit and Lu in U.S. Pat. No. 4,697,209.

In signature extraction systems, audio characteristic signatures are often utilized. Typically, these characteristic signatures are extracted by a unit located at the monitored receiver, sometimes referred to as a site unit. The site unit monitors the audio output of a television or radio receiver either by means of a microphone that picks up the sound from the speakers of the monitored receiver or by means of an output line from the monitored receiver. The site unit extracts and transmits the characteristic signatures to a central household unit, sometimes referred to as a home unit. Each characteristic signature is designed to uniquely characterize the audio signal tuned by the receiver during the time of signature extraction.

Characteristic signatures are typically transmitted from the home unit to a central office where a matching operation is performed between the characteristic signatures and a set of reference signatures extracted at a reference site from all of the audio channels that could have been tuned by the receiver in the household being monitored. A matching score is computed by a matching algorithm and is used to determine the identity of the program to which the monitored receiver was tuned or the program source (such as a broadcaster) of the tuned program.

Yet another approach to metering video and/or audio tuned by televisions and/or radios is to add ancillary identification codes to television and/or radio programs and to detect and decode the ancillary codes in order to identify the encoded programs or the corresponding program sources when the programs are tuned by monitored receivers. There are many arrangements for adding an ancillary code to a signal in such a way that the added code is not noticed. It is well known in television broadcasting, for example, to hide such ancillary codes in non-viewable portions of video by inserting them into either the video's vertical blanking interval or horizontal retrace interval. An exemplary system which hides codes in non-viewable portions of video is referred to as "AMOL" and is taught in U.S. Pat. No. 4,025,851. This system is used by the assignee of this application for monitoring transmissions of television programming as well as the times of such transmissions.

Other known video encoding systems have sought to bury the ancillary code in a portion of a television signal's transmission bandwidth that otherwise carries little signal energy. An example of such a system is disclosed by Dougherty in U.S. Pat. No. 5,629,739, which is assigned to the assignee of the present application.

Other methods and systems add ancillary codes to audio signals for the purpose of identifying the signals and, perhaps, for tracing their courses through signal distribution systems. Such arrangements have the obvious advantage of being applicable not only to television, but also to radio transmissions and to pre-recorded music. Moreover, ancillary codes which are added to audio signals may be reproduced in the audio signal output by a speaker. Accordingly, these arrangements offer the possibility of non-intrusively intercepting and decoding the codes with equipment that has a microphone as an input. In particular, these arrangements provide an approach to measuring program audiences by the use of portable metering equipment carried by panelists.

One such audio encoding system is disclosed by Crosby, in U.S. Pat. No. 3,845,391. In this system, a code is inserted in a narrow frequency "notch" from which the original audio signal is deleted. The notch is made at a fixed predetermined frequency (e.g., 40 Hz). This approach led to codes that were audible when the original audio signal containing the code was of low intensity.

A series of improvements followed the Crosby patent. Thus, Howard, in U.S. Pat. No. 4,703,476, teaches the use of two separate notch frequencies for the mark and the space portions of a code signal. Kramer, in U.S. Pat. No. 4,931,871 and in U.S. Pat. No. 4,945,412 teaches, inter alia, using a code signal having an amplitude that tracks the amplitude of the audio signal to which the code is added.

Program audience measurement systems in which panelists are expected to carry microphone-equipped audio monitoring devices that can pick up and store inaudible codes transmitted in an audio signal are also known. For example, Aijalla et al., in WO 94/11989 and in U.S. Pat. No. 5,579,124, describe an arrangement in which spread spectrum techniques are used to add a code to an audio signal so that the code is either not perceptible, or can be heard only as low level "static" noise. Also, Jensen et al., in U.S. Pat. No. 5,450,490, teach an arrangement for adding a code at a fixed set of frequencies and using one of two masking signals, where the choice of masking signal is made on the basis of a frequency analysis of the audio signal to which the code is to be added. Jensen et al. do not teach a coding arrangement in which the code frequencies vary from block to block. The intensity of the code inserted by Jensen et al. is a predetermined fraction of a measured value (e.g., 30 dB down from peak intensity) rather than comprising relative maxima or minima.

Moreover, Preuss et al., in U.S. Pat. No. 5,319,735, teach a multi-band audio encoding arrangement in which a spread spectrum code is inserted in recorded music at a fixed ratio to the input signal intensity (code-to-music ratio) that is preferably 19 dB. Lee et al., in U.S. Pat. No. 5,687,191, teach an audio coding arrangement suitable for use with digitized audio signals in which the code intensity is made to match the input signal by calculating a signal-to-mask ratio in each of several frequency bands and by then inserting the code at an intensity that is a predetermined ratio of the audio input in that band. As reported in this patent, Lee et al. have also described a method of embedding digital information in a digital waveform in pending U.S. application Ser. No. 08/524,132.

It will be recognized that, because ancillary codes are preferably inserted at low intensities in order to prevent the code from distracting a listener of program audio, such codes may be vulnerable to various signal processing operations. For example, although Lee et al. discuss digitized audio signals, it may be noted that many of the earlier known approaches to encoding an audio signal are not compatible with current and proposed digital audio standards, particularly those employing signal compression methods that may reduce the signal's dynamic range (and thereby delete a low level code) or that otherwise may damage an ancillary code. In this regard, it is particularly important for an ancillary code to survive compression and subsequent de-compression by the AC-3 algorithm or by one of the algorithms recommended in the ISO/IEC 11172 MPEG standard, which is expected to be widely used in future digital television transmission and reception systems.

U.S. patent application Ser. No. 09/116,397 filed Jul. 16, 1998 discloses a system and method for inserting a code into an audio signal so that the code is likely to survive compression and decompression as required by current and proposed digital audio standards. In this system and method, spectral modulation at selected code frequencies is used to insert the code into the audio signal. These code frequencies are varied from audio block to audio block, and the spectral modulation may be implemented as amplitude modulation, modulation by frequency swapping, phase modulation, and/or odd/even index modulation.

In most audio signals of the type used in television systems, a code inserted by spectral modulation in accordance with the aforementioned patent application is substantially inaudible. However, there are some instances where the code may be undesirably audible. The present invention addresses one or more of these instances. The present application also addresses methods of multi-level coding.

BRIEF DESCRIPTION OF THE DRAWING

These and other features and advantages will become more apparent from a detailed consideration of the invention when taken in conjunction with the drawings in which.

DETAILED DESCRIPTION OF THE INVENTION

Figure 1:
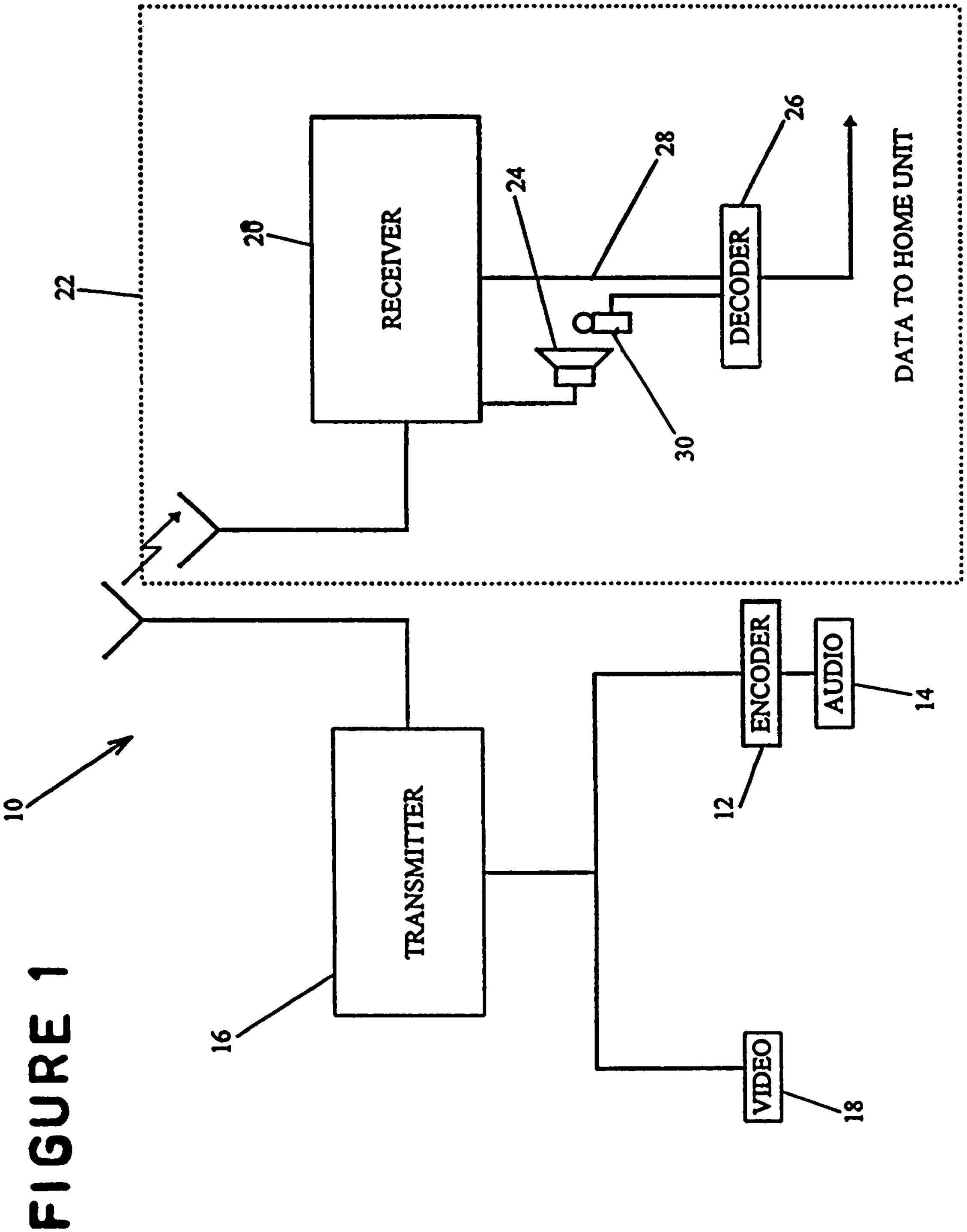
FIG. 1 is a schematic block diagram of an audience measurement system employing the signal coding and decoding arrangements of the present invention.

Audio signals are usually digitized at sampling rates that range between thirty-two kHz and forty-eight kHz. For example, a sampling rate of 44.1 kHz is commonly used during the digital recording of music. However, digital television ("DTV") is likely to use a forty eight kHz sampling rate. Besides the sampling rate, another parameter of interest in digitizing an audio signal is the number of binary bits used to represent the audio signal at each of the instants when it is sampled. This number of binary bits can vary, for example, between sixteen and twenty four bits per sample. The amplitude dynamic range resulting from using sixteen bits per sample of the audio signal is ninety-six dB. This decibel measure is the ratio between the square of the highest audio amplitude ($2^{16}$=65536) and the lowest audio amplitude ($1^2$=1). The dynamic range resulting from using twenty-four bits per sample is 144 dB. Raw audio, which is sampled at the 44.1 kHz rate and which is converted to a sixteen-bit per sample representation, results in a data rate of 705.6 kbits/s.

Compression of audio signals is performed in order to reduce this data rate to a level which makes it possible to transmit a stereo pair of such data on a channel with a throughput as low as 192 kbits/s. This compression typically is accomplished by transform coding. A block consisting of $N_d$=1024 samples, for example, may be decomposed, by application of a Fast Fourier Transform or other similar frequency analysis process, into a spectral representation. In order to prevent errors that may occur at the boundary between one block and the previous or subsequent block, overlapped blocks are commonly used. In one such arrangement where 1024 samples per overlapped block are used, a block includes 512 samples of "old" samples (i.e., samples from a previous block) and 512 samples of "new" or current samples. The spectral representation of such a block is divided into critical bands where each band comprises a group of several neighboring frequencies. The power in each of these bands can be calculated by summing the squares of the amplitudes of the frequency components within the band.

Audio compression is based on the principle of masking that, in the presence of high spectral energy at one frequency (i.e., the masking frequency), the human ear is unable to perceive a lower energy signal if the lower energy signal has a frequency (i.e., the masked frequency) near that of the higher energy signal. The lower energy signal at the masked frequency is called a masked signal. A masking threshold, which represents either (i) the acoustic energy required at the masked frequency in order to make it audible or (ii) an energy change in the existing spectral value that would be perceptible, can be dynamically computed for each band. The frequency components in a masked band can be represented in a coarse fashion by using fewer bits based on this masking threshold. That is, the masking thresholds and the amplitudes of the frequency components in each band are coded with a smaller number of bits which constitute the compressed audio. Decompression reconstructs the original signal based on this data.

FIG. 1 illustrates an audience measurement system 10 in which an encoder 12 adds an ancillary code to an audio signal portion 14 of a program signal to be transmitted. Alternatively, the encoder 12 may be provided, as is known in the art, at some other location in the program signal distribution chain. A transmitter 16 transmits the encoded audio signal portion with a video signal portion 18 of the program signal. When the encoded signal is received by a receiver 20 located at a statistically selected metering site 22, the ancillary code is recovered by processing the audio signal portion of the received program signal even though the presence of that ancillary code is imperceptible to a listener when the encoded audio signal portion is supplied to speakers 24 of the receiver 20. To this end, a decoder 26 is connected either directly to an audio output 28 available at the receiver 20 or to a microphone 30 placed in the vicinity of the speakers 24 through which the audio is reproduced. The received audio signal can be either in a monaural or stereo format.

ENCODING BY SPECTRAL MODULATION

Figure 2:
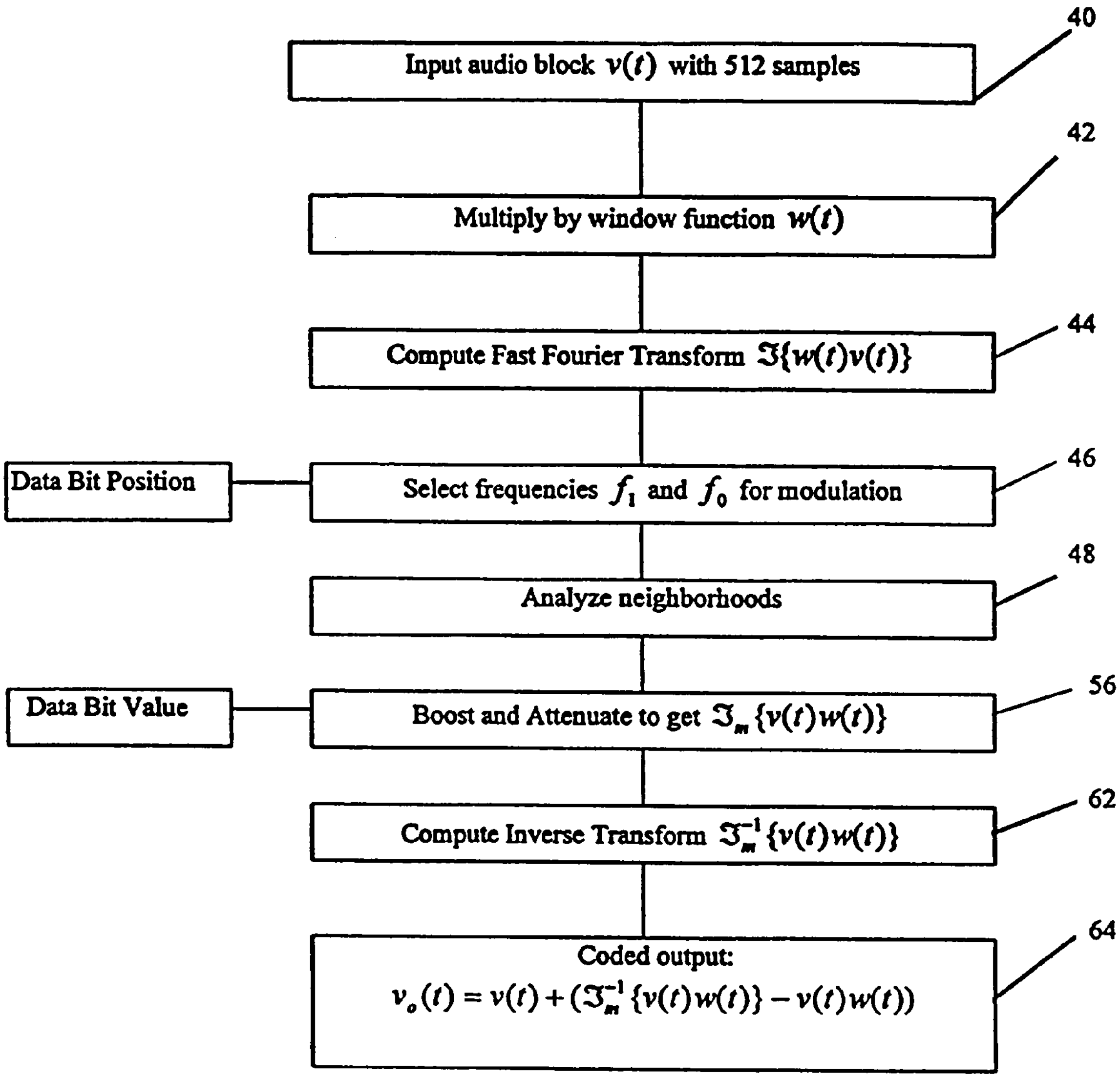
FIG. 2 is flow chart depicting steps performed by an encoder of the system shown in FIG. 1.

In order for the encoder 12 to embed a digital code in an audio data stream in a manner compatible with compression technology, the encoder 12 should preferably use frequencies and critical bands that match those used in compression. The block length $N_C$ of the audio signal that is used for coding may be chosen such that, for example, $jN_C=N_d=1024$, where j is an integer. A suitable value for $N_C$ may be, for example, 512. As depicted by a step 40 of the flow chart shown in FIG. 2, which is executed by the encoder 12, a first block v(t) of $N_C$ samples is derived from the audio signal portion 14 by the encoder 12 such as by use of an analog to digital converter, where v(t) is the time-domain representation of the audio signal within the block. An optional window may be applied to v(t) at a block 42 as discussed below in additional detail. Assuming for the moment that no such window is used, a Fourier Transform $\Im\{v(t)\}$ of the block v(t) to be coded is computed at a step 44. (The Fourier Transform implemented at the step 44 may be a Fast Fourier Transform.)

The frequencies resulting from the Fourier Transform are indexed in the range −256 to +255, where an index of 255 corresponds to exactly half the sampling frequency $f_S$. Therefore, for a forty-eight kHz sampling frequency, the highest index would correspond to a frequency of twenty-four kHz. Accordingly, for purposes of this indexing, the index closest to a particular frequency component $f_j$ resulting from the Fourier Transform $\Im\{v(t)\}$ is given by the following equation:

$$I_j = \left(\frac{255}{24}\right) \cdot f_j \tag{1}$$

where equation (1) is used in the following discussion to relate a frequency $f_j$ and its corresponding index $I_j$.

The code frequencies $f_i$ used for coding a block may be chosen from the Fourier Transform $\Im\{(v(t)\}$ at a step 46 in the 4.8 kHz to 6 kHz range in order to exploit the higher auditory threshold in this band. Also, each successive bit of the code may use a different pair of code frequencies $f_1$ and $f_0$ denoted by corresponding code frequency indexes $I_1$ and $I_0$. There are two preferred ways of selecting the code frequencies $f_1$ and $f_0$ at the step 46 so as to create an inaudible wide-band noise like code.

(a) Direct Sequence

One way of selecting the code frequencies $f_1$ and $f_0$ at the step 46 is to compute the code frequencies by use of a frequency hopping algorithm employing a hop sequence $H_S$ and a shift index $I_{shift}$. For example, if $N_s$ bits are grouped together to form a pseudo-noise sequence, $H_S$ is an ordered sequence of $N_s$ numbers representing the frequency deviation relative to a predetermined reference index $I_{5k}$. For the case where $N_s=7$, a hop sequence $H_S=\{2,5,1,4,3,2,5\}$ and a shift index $I_{shift}=5$, for example, could be used. In general, the indices for the $N_s$ bits resulting from a hop sequence may be given by the following equations:

$$I_1=I_{5k}+H_s-I_{shift} \tag{2}$$

and $$I_0+I_{5k}+H_sI_{shift} \tag{3}$$

One possible choice for the reference frequency $f_{5k}$ is five kHz, for example, which corresponds to a predetermined reference index $I_{5k}=53$. This value of $f_{5k}$ is chosen because it is above the average maximum sensitivity frequency of the human ear. When encoding a first block of the audio signal, $I_1$ and $I_0$ for the first block are determined from equations (2) and (3) using a first of the hop sequence numbers; when encoding a second block of the audio signal, $I_1$ and $I_0$ for the second block are determined from equations (2) and (3) using a second of the hop sequence numbers; and so on. For the fifth bit in the sequence {2,5,1,4,3,2,5}, for example, the hop sequence value is three and, using equations (2) and (3), produces an index $I_1=51$ and an index $I_0=61$ in the case where $I_{shift}=5$. In this example, the mid-frequency index is given by the following equation:

$$I_{mid}=I_{5k}+3=56 \tag{4}$$

where $I_{mid}$ represents an index mid-way between the code frequency indices $I_1$ and $I_0$. Accordingly, each of the code frequency indices is offset from the mid-frequency index by the same magnitude, $I_{shift}$, but the two offsets have opposite signs.

(b) Hopping Based on Low Frequency Maximum

Another way of selecting the code frequencies at the step 46 is to determine a frequency index $I_{max}$ at which the spectral power of the audio signal, as determined as the step 44, is a maximum in the low frequency band extending from zero Hz to two kHz. In other words, $I_{max}$ is the index corresponding to the frequency having maximum power in the range of 0–2 kHz. It is useful to perform this calculation starting at index 1, because index 0 represents the "local" DC component and may be modified by high pass filters used in compression. The code frequency indices $I_1$ and $I_0$ are chosen relative to the frequency index $I_{max}$ so that they lie in a higher frequency band at which the human ear is relatively less sensitive. Again, one possible choice for the reference frequency $f_{5k}$ is five kHz corresponding to a reference index $I_{5k}$=53 such that $I_1$ and $I_0$ are given by the following equations:

$$I_1 I_{5k}+I_{max}-I_{shift} \quad (5)$$

and $$I_0=I_{5k}+I_{max}+I_{shift} \quad (6)$$

where $I_{shift}$ is a shift index, and where $I_{max1}$ varies according to the spectral power of the audio signal. An important observation here is that a different set of code frequency indices $I_1$ and $I_0$ from input block to input block is selected for spectral modulation depending on the frequency index $I_{max}$ of the corresponding input block. In this case, a code bit is coded as a single bit: however, the frequencies that are used to encode each bit hop from block to block.

Unlike many traditional coding methods, such as Frequency Shift Keying (FSK) or Phase Shift Keying (PSK), the present invention does not rely on a single fixed frequency. Accordingly, a "frequency-hopping" effect is created similar to that seen in spread spectrum modulation systems. However, unlike spread spectrum, the object of varying the coding frequencies of the present invention is to avoid the use of a constant code frequency which may render it audible.

For either of the two code frequencies selection approaches (a) and (b) described above, there are at least four modulation methods that can be implemented at a step 56 in order to encode a binary bit of data in an audio block, i.e., amplitude modulation, modulation by frequency swapping, phase modulation, and odd/even index modulation. These four methods of modulation are separately described below.

(i) Amplitude Modulation

In order to code a binary '1' using amplitude modulation, the spectral power at $I_1$ is increased to a level such that it constitutes a maximum in its corresponding neighborhood of frequencies. The neighborhood of indices corresponding to this neighborhood of frequencies is analyzed at a step 48 in order to determine how much the code frequencies $f_1$ and $f_0$ must be boosted and attenuated, respectively, so that they are detectable by the decoder 26. For index $I_1$, the neighborhood may preferably extend from $I_1-2$ to $I_1+2$, and is constrained to cover a narrow enough range of frequencies that the neighborhood of $I_1$ does not overlap the neighborhood of $I_0$. Simultaneously, the spectral power at $I_0$ is modified in order to make it a minimum in its neighborhood of indices ranging from $I_0-2$ to $I_0+2$. Conversely, in order to code a binary '0' using amplitude modulation, the power at $I_0$ is boosted and the power at $I_1$ is attenuated in their corresponding neighborhoods.

Figure 3:
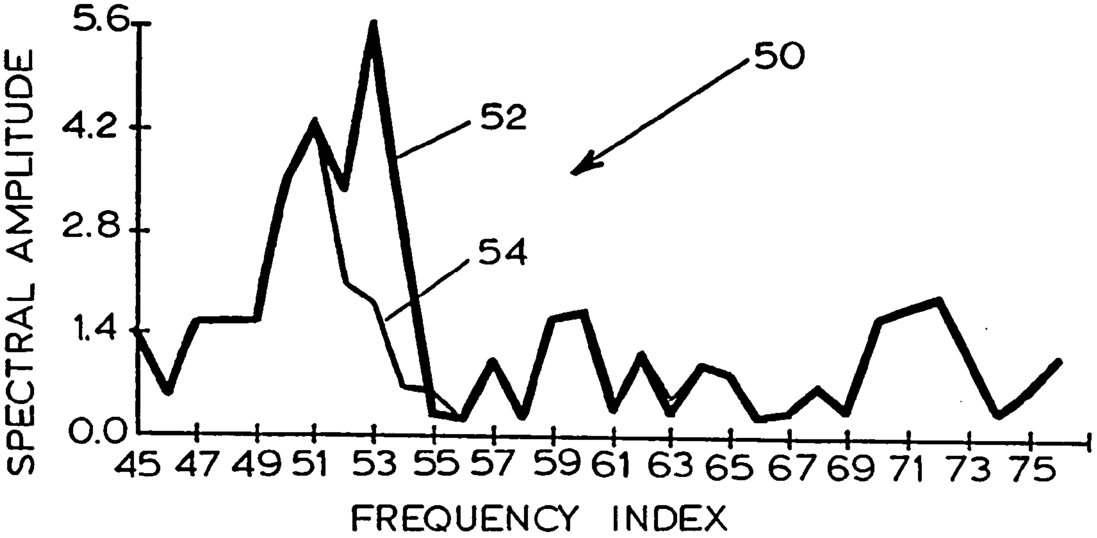
FIG. 3 is a spectral plot of an audio block, wherein the thin line of the plot is the spectrum of the original audio signal and the thick line of the plot is the spectrum of the signal modulated in accordance with the present invention.

As an example, FIG. 3 shows a typical spectrum 50 of a $N_C$ sample audio block plotted over a range of frequency index from forty five to seventy seven. A spectrum 52 shows the audio block after coding of a '1' bit, and a spectrum 54 shows the audio block before coding. In this particular instance of encoding a '1' bit according to code frequency selection approach (a), the hop sequence value is five which yields a mid-frequency index of fifty eight. The values for $I_1$ and $I_0$ are fifty three and sixty three, respectively. The spectral amplitude at fifty three is then modified at a step 56 of FIG. 2 in order to make it a maximum within its neighborhood of indices. The amplitude at sixty three already constitutes a minimum and, therefore, only a small additional attenuation is applied at the step 56.

The spectral power modification process requires the computation of four values each in the neighborhood of $I_1$ and $I_0$. For the neighborhood of $I_1$ these four values are as follows: (1) $I_{max1}$ which is the index of the frequency in the neighborhood of $I_1$ having maximum power; (2) $P_{max1}$ which is the spectral power at $I_{max1}$; (3) $I_{min1}$ which is the index of the frequency in the neighborhood of $I_1$ having minimum power; and (4) $P_{min1}$ which is the spectral power at $I_{min1}$. Corresponding values for the $I_0$ neighborhood are $I_{max0}$, $P_{max0}$, $I_{min0}$, and $P_{min0}$.

If $I_{max1}=I_1$, and if the binary value to be coded is a '1,' only a token increase in $P_{max1}$ (i.e., the power at $I_1$) is required at the step 56. Similarly, if $I_{min0}=I_0$, then only a token decrease in $P_{max0}$ (i.e., the power at $I_0$) is required at the step 56. When $P_{max1}$ is boosted, it is multiplied by a factor 1+A at the step 56, where A is in the range of about 1.5 to about 2.0. The choice of A is based on experimental audibility tests combined with compression survivability tests. The condition for imperceptibility requires a low value for A, whereas the condition for compression survivability requires a large value for A. A fixed value of A may not lend itself to only a token increase or decrease of power. Therefore, a more logical choice for A would be a value based on the local masking threshold. In this case, A is variable, and coding can be achieved with a minimal incremental power level change and yet survive compression.

In either case, the spectral power at $I_1$ is given by the following equation:

$$P_{I1}=(1+A)\cdot P_{max1} \quad (7)$$

with suitable modification of the real and imaginary parts of the frequency component at $I_1$. The real and imaginary parts are multiplied by the same factor in order to keep the phase angle constant. The power at $I_0$ is reduced to a value corresponding to $(1+A)^{-1}$ $P_{min0}$ in a similar fashion.

The Fourier Transform of the block to be coded as determined at the step 44 also contains negative frequency components with indices ranging in index values from −256 to −1. Spectral amplitudes at frequency indices $-I_1$ and $-I_0$ must be set to values representing the complex conjugate of amplitudes at $I_1$ and $I_0$, respectively, according to the following equations:

$$Re[f(-I_1)]=Re[f(I_1)] \quad (8)$$

$$Im[f(-I_1)]=-Im[f(I_1)] \quad (9)$$

$$Re[f(-I_0)]=Re[f(I_0)] \quad (10)$$

$$Im[f(-I_0)]=-Im[f(I_0)] \quad (11)$$

where f(I) is the complex spectral amplitude at index I.

Compression algorithms based on the effect of masking modify the amplitude of individual spectral components by means of a bit allocation algorithm. Frequency bands subjected to a high level of masking by the presence of high spectral energies in neighboring bands are assigned fewer bits, with the result that their amplitudes are coarsely quantized. However, the decompressed audio under most conditions tends to maintain relative amplitude levels at frequencies within a neighborhood. The selected frequencies in the encoded audio stream which have been amplified or attenuated at the step 56 will, therefore, maintain their relative positions even after a compression/decompression process.

It may happen that the Fourier Transform $\Im\{v(t)\}$ of a block may not result in a frequency component of sufficient amplitude at the frequencies $f_1$ and $f_0$ to permit encoding of a bit by boosting the power at the appropriate frequency. In this event, it is preferable not to encode this block and to instead encode a subsequent block where the power of the signal at the frequencies $f_1$ and $f_0$ is appropriate for encoding.

(ii) Modulation by Frequency Swapping

In this approach, which is a variation of the amplitude modulation approach described above in section (i), the spectral amplitudes at $I_1$ and $I_{max1}$ are swapped when encoding a one bit while retaining the original phase angles at $I_1$ and $I_{max1}$. A similar swap between the spectral amplitudes at $I_0$ and $I_{max0}$ is also performed. When encoding a zero bit, the roles of $I_1$ and $I_0$ are reversed as in the case of amplitude modulation. As in the previous case, swapping is also applied to the corresponding negative frequency indices. This encoding approach results in a lower audibility level because the encoded signal undergoes only a minor frequency distortion. Both the unencoded and encoded signals have identical energy values.

(iii) Phase Modulation

The phase angle associated with a spectral component $I_0$ is given by the following equation:

$$\phi_0 = \tan^{-1}\frac{Im[f(I_o)]}{Re[f(I_0)]} \tag{12}$$

where $0 \leqq \Phi_0 \leqq 2n$. The phase angle associated with $I_1$ can be computed in a similar fashion. In order to encode a binary number, the phase angle of one of these components, usually the component with the lower spectral amplitude, can be modified to be either in phase (i.e., 0°) or out of phase (i.e., 180°) with respect to the other component, which becomes the reference. In this manner, a binary 0 may be encoded as an in-phase modification and a binary 1 encoded as an out-of-phase modification. Alternatively, a binary 1 may be encoded as an in-phase modification and a binary 0 encoded as an out-of-phase modification. The phase angle of the component that is modified is designated $\Phi_M$, and the phase angle of the other component is designated $\Phi_R$. Choosing the lower amplitude component to be the modifiable spectral component minimizes the change in the original audio signal.

In order to accomplish this form of modulation, one of the spectral components may have to undergo a maximum phase change of 180°, which could make the code audible. In practice, however, it is not essential to perform phase modulation to this extent, as it is only necessary to ensure that the two components are either "close" to one another in phase or "far" apart. Therefore, at the step 48, a phase neighborhood extending over a range of $\pm\pi/4$ around $\Phi_R$, the reference component, and another neighborhood extending over a range of $\pm\pi/4$ around $\Phi_R+\pi$ may be chosen. The modifiable spectral component has its phase angle $\Phi_M$ modified at the step 56 so as to fall into one of these phase neighborhoods depending upon whether a binary '0' or a binary '1' is being encoded. If a modifiable spectral component is already in the appropriate phase neighborhood, no phase modification may be necessary. In typical audio streams, approximately 30% of the segments are "self-coded" in this manner and no modulation is required. The inverse Fourier Transform is determined at the step 62.

(iv) Odd/Even Index Modulation

In this odd/even index modulation approach, a single code frequency index, $I_1$, selected as in the case of the other modulation schemes, is used. A neighborhood defined by indexes $I_1$, $I_1+1$, $I_1+2$, and $I_1+3$, is analyzed to determine whether the index $I_M$ corresponding to the spectral component having the maximum power in this neighborhood is odd or even. If the bit to be encoded is a '1' and the index $I_M$ is odd, then the block being coded is assumed to be "auto-coded." Otherwise, an odd-indexed frequency in the neighborhood is selected for amplification in order to make it a maximum. A bit '0' is coded in a similar manner using an even index. In the neighborhood consisting of four indexes, the probability that the parity of the index of the frequency with maximum spectral power will match that required for coding the appropriate bit value is 0.25. Therefore, 25% of the blocks, on an average, would be auto-coded. This type of coding will significantly decrease code audibility.

A practical problem associated with block coding by either amplitude or phase modulation of the type described above is that large discontinuities in the audio signal can arise at a boundary between successive blocks. These sharp transitions can render the code audible. In order to eliminate these sharp transitions, the time-domain signal v(t) can be multiplied by a smooth envelope or window function w(t) at the step 42 prior to performing the Fourier Transform at the step 44. No window function is required for the modulation by frequency swapping approach described herein. The frequency distortion is usually small enough to produce only minor edge discontinuities in the time domain between adjacent blocks.

Figure 4:
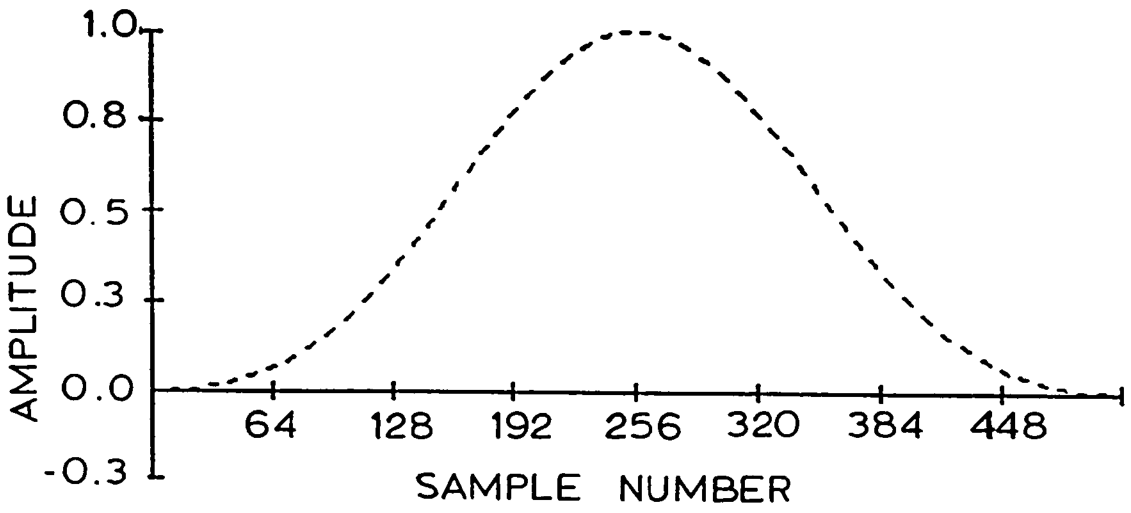
FIG. 4 depicts a window function which may be used to prevent transient effects that might otherwise occur at the boundaries between adjacent encoded blocks.

The window function w(t) is depicted in FIG. 4. Therefore, the analysis performed at the step 54 is limited to the central section of the block resulting from $\Im_m\{v(t)w(t)\}$. The required spectral modulation is implemented at the step 56 on the transform $\Im\{v(t)w(t)\}$.

The modified frequency spectrum which now contains the binary code (either '0' or '1') is subjected to an inverse transform operation at a step 62 in order to obtain the encoded time domain signal, as will be discussed below. Following the step 62, the coded time domain signal is determined at a step 64 according to the following equation:

$$v_0(t)=v(t)+(\Im_m^{-1}(v(t)w(t))-v(t)w(t)) \tag{13}$$

where the first part of the right hand side of equation (13) is the original audio signal v(t), where the second part of the right hand side of equation (13) is the encoding, and where the left hand side of equation (13) is the resulting encoded audio signal $v_0(t)$.

Figure 5:
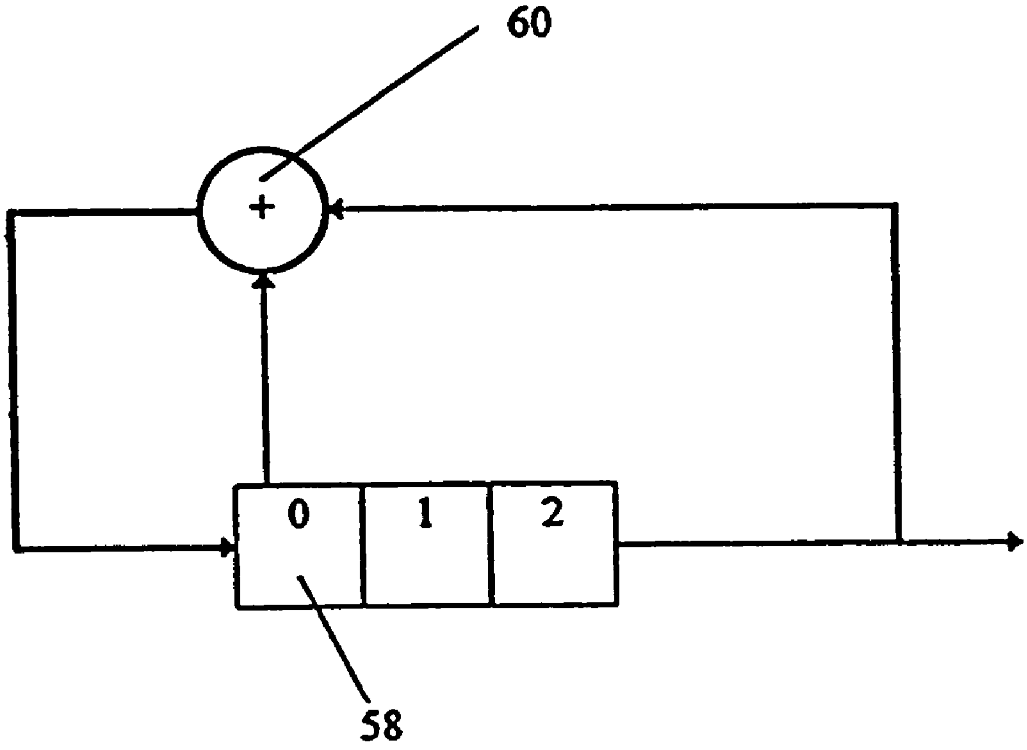
FIG. 5 is a schematic block diagram of an arrangement for generating a seven-bit pseudo-noise synchronization sequence.

While individual bits can be coded by the method described thus far, practical decoding of digital data also requires (i) synchronization, so as to locate the start of data, and (ii) built-in error correction, so as to provide for reliable data reception. The raw bit error rate resulting from coding by spectral modulation is high and can typically reach a value of 20%. In the presence of such error rates, both synchronization and error-correction may be achieved by using pseudo-noise (PN) sequences of ones and zeroes. A PN sequence can be generated, for example, by using an m-stage shift register 58 (where m is three in the case of FIG. 5) and an exclusive-OR gate 60 as shown in FIG. 5. For convenience, an n-bit PN sequence is referred to herein as a PNn sequence. For an $N_{PN}$ bit PN sequence, an m-stage shift register is required operating according to the following equation:

$$N_{PN}=2^m-1 \tag{14}$$

where m is an integer. With m=3, for example, the 7-bit PN sequence (PN7) is 1110100. The particular sequence depends upon an initial setting of the shift register 58. In one robust version of the encoder 12, each individual bit of data is represented by this PN sequence—i.e., 1110100 is used for a bit '1,' and the complement 0001011 is used for a bit '0.' The use of seven bits to code each bit of code results in extremely high coding overheads.

An alternative method uses a plurality of PN15 sequences, each of which includes five bits of code data and 10 appended error correction bits. This representation provides a Hamming distance of 7 between any two 5-bit code data words. Up to three errors in a fifteen bit sequence can be detected and corrected. This PN15 sequence is ideally suited for a channel with a raw bit error rate of 20%.

Figure 6:
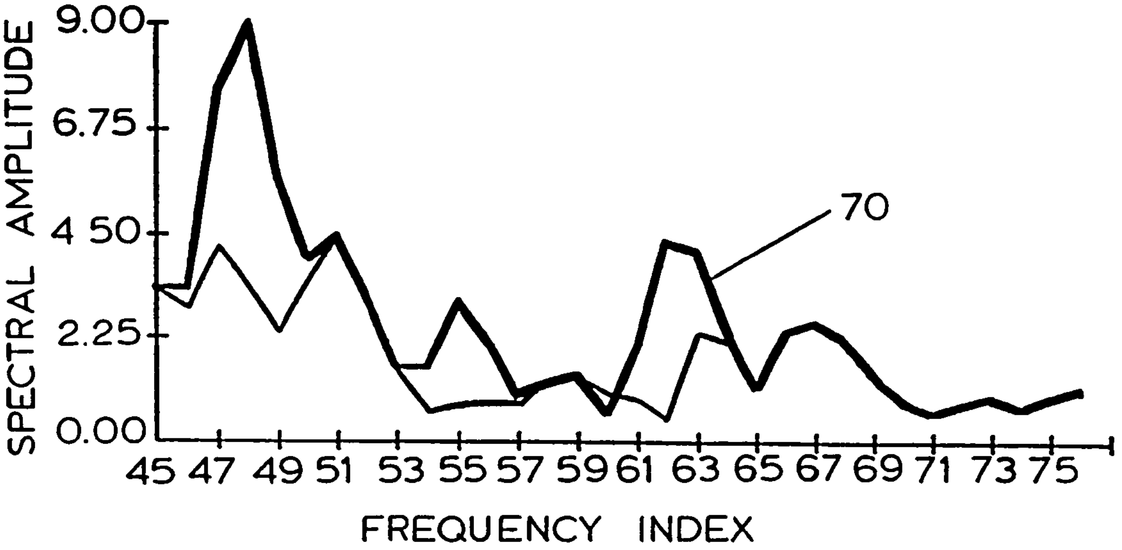
FIG. 6 is a spectral plot of a "triple tone" audio block which forms the first block of a preferred synchronization sequence, where the thin line of the plot is the spectrum of the original audio signal and the thick line of the plot is the spectrum of the modulated signal.

In terms of synchronization, a unique synchronization sequence 66 (FIG. 7*a*) is required for synchronization in order to distinguish PN15 code bit sequences 74 from other bit sequences in the coded data stream. In a preferred embodiment shown in FIG. 7*b*, the first code block of the synchronization sequence 66 uses a "triple tone" 70 of the synchronization sequence in which three frequencies with indices $I_0$, $I_1$, and $I_{mid}$ are all amplified sufficiently that each becomes a maximum in its respective neighborhood, as depicted by way of example in FIG. 6. It will be noted that, although it is preferred to generate the triple tone 70 by amplifying the signals at the three selected frequencies to be relative maxima in their respective frequency neighborhoods, those signals could instead be locally attenuated so that the three associated local extreme values comprise three local minima. It should be noted that any combination of local maxima and local minima could be used for the triple tone 70. However, because program audio signals include substantial periods of silence, the preferred approach involves local amplification rather than local attenuation. Being the first bit in a sequence, the hop sequence value for the block from which the triple tone 70 is derived is two and the mid-frequency index is fifty-five. In order to make the triple tone block truly unique, a shift index of seven may be chosen instead of the usual five. The three indices $I_0$, $I_1$, and $I_{mid}$ whose amplitudes are all amplified are forty-eight, sixty-two and fifty-five as shown in FIG. 6. (In this example, $I_{mid}=H_S+53=2+53=55$.) The triple tone 70 is the first block of the fifteen block sequence 66 and essentially represents one bit of synchronization data. The remaining fourteen blocks of the synchronization sequence 66 are made up of two PN7 sequences: 1110100, 0001011. This makes the fifteen synchronization blocks distinct from all the PN sequences representing code data.

Figure 7A:
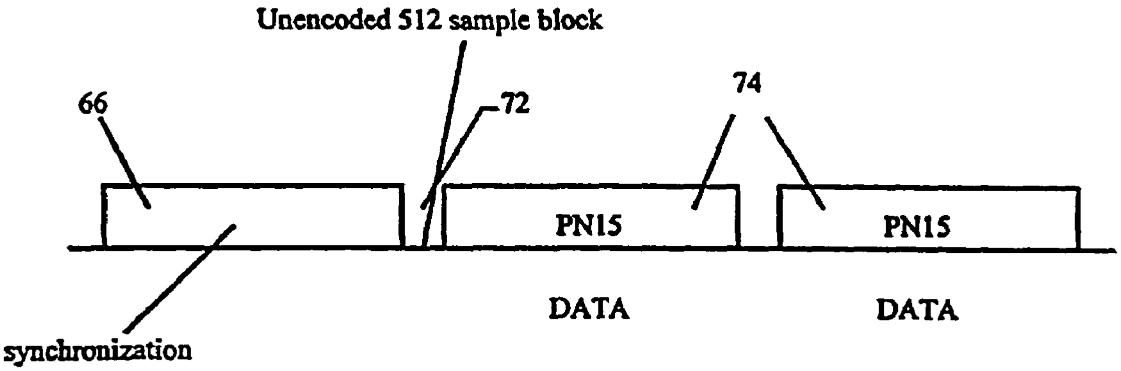
FIG. 7*a* schematically depicts an arrangement of synchronization and information blocks usable to form a complete code message.
Figure 7B:
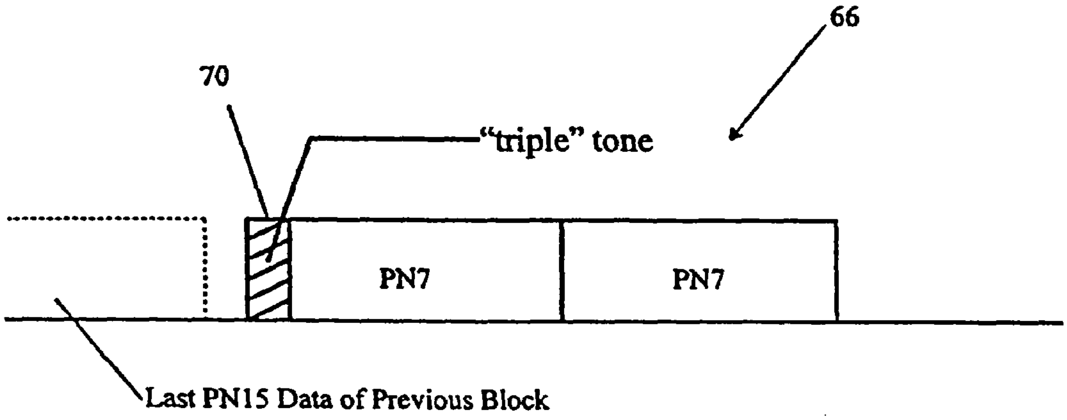
FIG. 7*b* schematically depicts further details of the synchronization block shown in FIG. 7*a;*

As stated earlier, the code data to be transmitted is converted into five bit groups, each of which is represented by a PN15 sequence. As shown in FIG. 7*a*, an unencoded block 72 is inserted between each successive pair of PN sequences 74. During decoding, this unencoded block 72 (or gap) between neighboring PN sequences 74 allows precise synchronizing by permitting a search for a correlation maximum across a range of audio samples.

In the case of stereo signals, the left and right channels are encoded with identical digital data. In the case of mono signals, the left and right channels are combined to produce a single audio signal stream. Because the frequencies selected for modulation are identical in both channels, the resulting monophonic sound is also expected to have the desired spectral characteristics so that, when decoded, the same digital code is recovered.

Decoding the Spectrally Modulated Signal

In most instances, the embedded digital code can be recovered from the audio signal available at the audio output 28 of the receiver 20. Alternatively, or where the receiver 20 does not have an audio output 28, an analog signal can be reproduced by means of the microphone 30 placed in the vicinity of the speakers 24. In the case where the microphone 30 is used, or in the case where the signal on the audio output 28 is analog, the decoder 20 converts the analog audio to a sampled digital output stream at a preferred sampling rate matching the sampling rate of the encoder 12. In decoding systems where there are limitations in terms of memory and computing power, a half-rate sampling could be used. In the case of half-rate sampling, each code block would consist of $N_C/2=256$ samples, and the resolution in the frequency domain (i.e., the frequency difference between successive spectral components) would remain the same as in the full sampling rate case. In the case where the receiver 20 provides digital outputs, the digital outputs are processed directly by the decoder 26 without sampling but at a data rate suitable for the decoder 26.

The task of decoding is primarily one of matching the decoded data bits with those of a PN15 sequence which could be either a synchronization sequence or a code data sequence representing one or more code data bits. The case of amplitude modulated audio blocks is considered here. However, decoding of phase modulated blocks is virtually identical, except for the spectral analysis, which would compare phase angles rather than amplitude distributions, and decoding of index modulated blocks would similarly analyze the parity of the frequency index with maximum power in the specified neighborhood. Audio blocks encoded by frequency swapping can also be decoded by the same process.

In a practical implementation of audio decoding, such as may be used in a home audience metering system, the ability to decode an audio stream in real-time is highly desirable. It is also highly desirable to transmit the decoded data to a central office. The decoder 26 may be arranged to run the decoding algorithm described below on Digital Signal Processing (DSP) based hardware typically used in such applications. As disclosed above, the incoming encoded audio signal may be made available to the decoder 26 from either the audio output 28 or from the microphone 30 placed in the vicinity of the speakers 24. In order to increase processing speed and reduce memory requirements, the decoder 26 may sample the incoming encoded audio signal at half (24 kHz) of the normal 48 kHz sampling rate.

Before recovering the actual data bits representing code information, it is necessary to locate the synchronization sequence. In order to search for the synchronization sequence within an incoming audio stream, blocks of 256 samples, each consisting of the most recently received sample and the 255 prior samples, could be analyzed. For real-time operation, this analysis, which includes computing the Fast Fourier Transform of the 256 sample block, has to be completed before the arrival of the next sample. Performing a 256-point Fast Fourier Transform on a 40 MHZ DSP processor takes about 600 microseconds. However, the time between samples is only 40 microseconds, making real time processing of the incoming coded audio signal as described above impractical with current hardware.

Therefore, instead of computing a normal Fast Fourier Transform on each 256 sample block, the decoder 26 may be arranged to achieve real-time decoding by implementing an incremental or sliding Fast Fourier Transform routine 100 (FIG. 8) coupled with the use of a status information array SIS that is continuously updated as processing progresses. This array comprises p elements SIS[0] to SIS[p−1]. If p=64, for example, the elements in the status information array SIS are SIS[0] to SIS[63].

Moreover, unlike a conventional transform which computes the complete spectrum consisting of 256 frequency "bins," the decoder 26 computes the spectral amplitude only at frequency indexes that belong to the neighborhoods of interest, i.e., the neighborhoods used by the encoder 12. In a typical example, frequency indexes ranging from 45 to 70 are adequate so that the corresponding frequency spectrum contains only twenty-six frequency bins. Any code that is recovered appears in one or more elements of the status information array SIS as soon as the end of a message block is encountered.

Additionally, it is noted that the frequency spectrum as analyzed by a Fast Fourier Transform typically changes very little over a small number of samples of an audio stream. Therefore, instead of processing each block of 256 samples consisting of one "new" sample and 255 "old" samples, 256 sample blocks may be processed such that, in each block of 256 samples to be processed, the last k samples are "new" and the remaining 256-k samples are from a previous analysis. In the case where k=4, processing speed may be increased by skipping through the audio stream in four sample increments, where a skip factor k is defined as k=4 to account for this operation.

Each element SIS[p] of the status information array SIS consists of five members: a previous condition status PCS, a next jump index JI, a group counter GC, a raw data array DA, and an output data array OP. The raw data array DA has the capacity to hold fifteen integers. The output data array OP stores ten integers, with each integer of the output data array OP corresponding to a five bit number extracted from a recovered PN15 sequence. This PN15 sequence, accordingly, has five actual data bits and ten other bits. These other bits may be used, for example, for error correction. It is assumed here that the useful data in a message block consists of 50 bits divided into 10 groups with each group containing 5 bits, although a message block of any size may be used.

Figure 8:
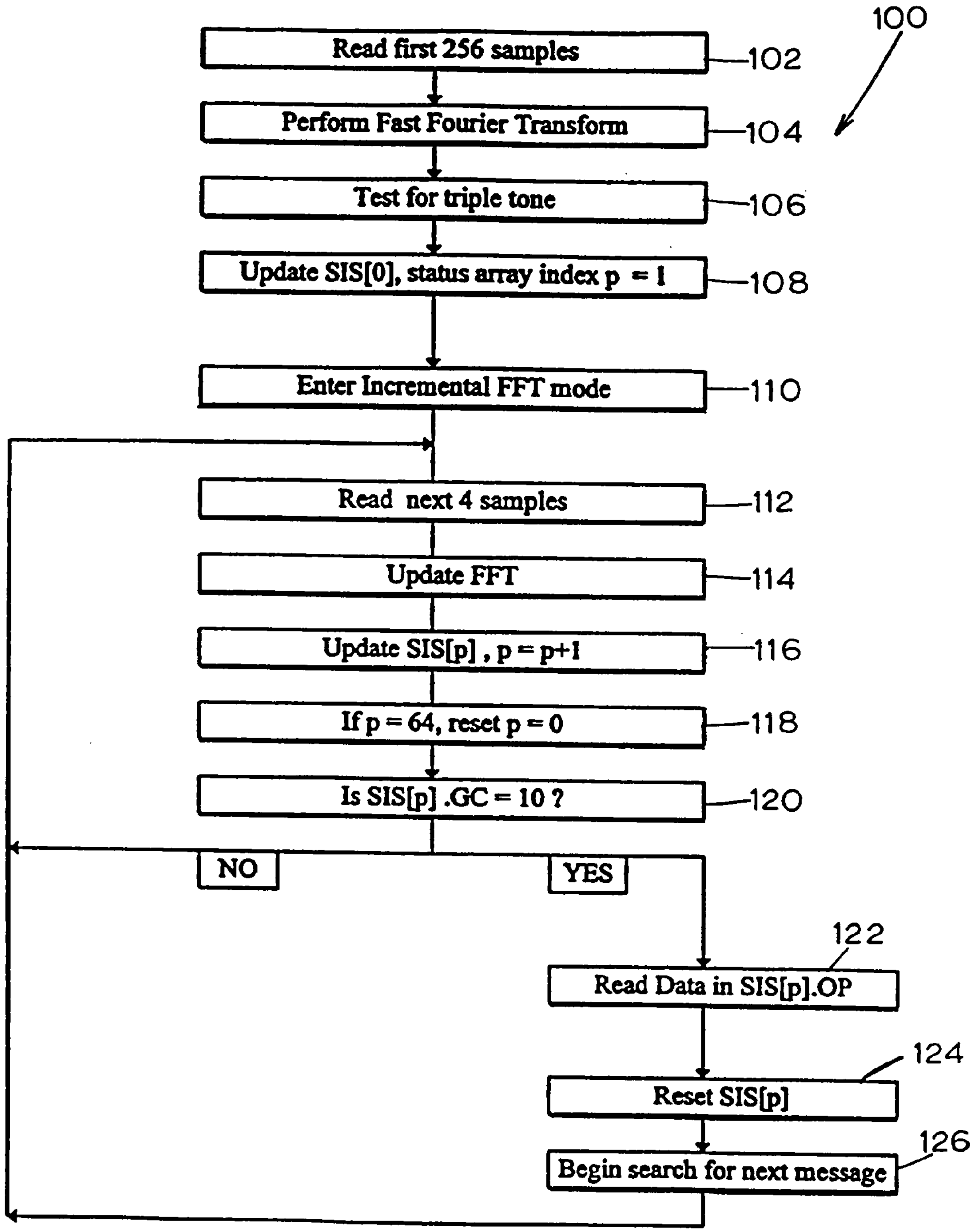
FIG. 8 is a flow chart depicting steps performed by a decoder of the system shown in FIG. 1; and, FIG. 9 illustrates an encoding arrangement in which audio encoding delays are compensated in the video data stream.

The operation of the status information array SIS is best explained in connection with FIG. 8. An initial block of 256 samples of received audio is read into a buffer at a processing stage 102. The initial block of 256 samples is analyzed at a processing stage 104 by a conventional Fast Fourier Transform to obtain its spectral power distribution. All subsequent transforms implemented by the routine 100 use the high-speed incremental approach referred to above and described below.

In order to first locate the synchronization sequence, the Fast Fourier Transform corresponding to the initial 256 sample block read at the processing stage 102 is tested at a processing stage 106 for a triple tone, which represents the first bit in the synchronization sequence. The presence of a triple tone may be determined by examining the initial 256 sample block for the indices $I_0$, $I_1$, and $I_{mid}$ used by the encoder 12 in generating the triple tone, as described above. The SIS[p] element of the SIS array that is associated with this initial block of 256 samples is SIS[0], where the status array index p is equal to 0. If a triple tone is found at the processing stage 106, the values of certain members of the SIS[0] element of the status information array SIS are changed at a processing stage 108 as follows: the previous condition status PCS, which is initially set to 0, is changed to a 1 indicating that a triple tone was found in the sample block corresponding to SIS[0]; the value of the next jump index JI is incremented to 1; and, the first integer of the raw data member DA[0] in the raw data array DA is set to the value (0 or 1) of the triple tone. In this case, the first integer of the raw data member DA[0] in the raw data array DA is set to 1 because it is assumed in this analysis that the triple tone is the equivalent of a 1 bit. Also, the status array index p is incremented by one for the next sample block. If there is no triple tone, none of these changes in the SIS[0] element are made at the processing stage 108, but the status array index p is still incremented by one for the next sample block. Whether or not a triple tone is detected in this 256 sample block, the routine 100 enters an incremental FFT mode at a processing stage 110.

Accordingly, a new 256 sample block increment is read into the buffer at a processing stage 112 by adding four new samples to, and discarding the four oldest samples from, the initial 256 sample block processed at the processing stages 102–106. This new 256 sample block increment is analyzed at a processing stage 114 according to the following steps:

STEP 1: the skip factor k of the Fourier Transform is applied according to the following equation in order to modify each frequency component $F_{old}(u_0)$ of the spectrum corresponding to the initial sample block in order to derive a corresponding intermediate frequency component $F_1(u_0)$ $$F_1(u_0) = F_{old}(u_0)\exp-\left(\frac{2\pi u_0 k}{256}\right) \tag{15}$$

where $u_0$ is the frequency index of interest. In accordance with the typical example described above, the frequency index $u_0$ varies from 45 to 70. It should be noted that this first step involves multiplication of two complex numbers.

STEP 2: the effect of the first four samples of the old 256 sample block is then eliminated from each $F_1(u_0)$ of the spectrum corresponding to the initial sample block and the effect of the four new samples is included in each $F_1(u_0)$ of the spectrum corresponding to the current sample block increment in order to obtain the new spectral amplitude $F_{new}(u_0)$ for each frequency index $u_0$ according to the following equation:

$$F_{new}(u_0) = F_1(u_0) + \sum_{m=1}^{m=4} (f_{new}(m) - f_{old}(m))\exp - \left(\frac{2\pi u_0(k-m+1)}{256}\right) \quad (16)$$

where $f_{old}$ and $f_{new}$ are the time-domain sample values. It should be noted that this second step involves the addition of a complex number to the summation of a product of a real number and a complex number. This computation is repeated across the frequency index range of interest (for example, 45 to 70).

STEP 3: the effect of the multiplication of the 256 sample block by the window function in the encoder 12 is then taken into account. That is, the results of step 2 above are not confined by the window function that is used in the encoder 12. Therefore, the results of step 2 preferably should be multiplied by this window function. Because multiplication in the time domain is equivalent to a convolution of the spectrum by the Fourier Transform of the window function, the results from the second step may be convolved with the window function. In this case, the preferred window function for this operation is the following well known "raised cosine" function which has a narrow 3-index spectrum with amplitudes (−0.50, 1, +0.50):

$$w(t) = \frac{1}{2}\left[1 - \cos\left(\frac{2\pi t}{T_w}\right)\right] \quad (17)$$

where $T_W$ is the width of the window in the time domain. This "raised cosine" function requires only three multiplication and addition operations involving the real and imaginary parts of the spectral amplitude. This operation significantly improves computational speed. This step is not required for the case of modulation by frequency swapping.

STEP 4: the spectrum resulting from step 3 is then examined for the presence of a triple tone. If a triple tone is found, the values of certain members of the SIS[1] element of the status information array SIS are set at a processing stage 116 as follows: the previous condition status PCS, which is initially set to 0, is changed to a 1; the value of the next jump index JI is incremented to 1; and, the first integer of the raw data member DA[1] in the raw data array DA is set to 1. Also, the status array index p is incremented by one. If there is no triple tone, none of these changes are made to the members of the structure of the SIS[1] element at the processing stage 116, but the status array index p is still incremented by one.

Because p is not yet equal to 64 as determined at a processing stage 118 and the group counter GC has not accumulated a count of 10 as determined at a processing stage 120, this analysis corresponding to the processing stages 112–120 proceeds in the manner described above in four sample increments where p is incremented for each sample increment. When SIS[63] is reached where p=64, p is reset to 0 at the processing stage 118 and the 256 sample block increment now in the buffer is exactly 256 samples away from the location in the audio stream at which the SIS[0] element was last updated. Each time p reaches 64, the SIS array represented by the SIS[0]–SIS[63] elements is examined to determine whether the previous condition status PCS of any of these elements is one indicating a triple tone. If the previous condition status PCS of any of these elements corresponding to the current 64 sample block increments is not one, the processing stages 112–120 are repeated for the next 64 block increments. (Each block increment comprises 256 samples.)

Once the previous condition status PCS is equal to 1 for any of the SIS[0]–SIS[63] elements corresponding to any set of 64 sample block increments, and the corresponding raw data member DA[p] is set to the value of the triple tone bit, the next 64 block increments are analyzed at the processing stages 112–120 for the next bit in the synchronization sequence.

Each of the new block increments beginning where p was reset to 0 is analyzed for the next bit in the synchronization sequence. This analysis uses the second member of the hop sequence $H_S$ because the next jump index JI is equal to 1. From this hop sequence number and the shift index used in encoding, the $I_1$ and $I_0$ indexes can be determined, for example from equations (2) and (3). Then, the neighborhoods of the $I_1$ and $I_0$ indexes are analyzed to locate maximums and minimums in the case of amplitude modulation. If, for example, a power maximum at $I_1$ and a power minimum at $I_0$ are detected, the next bit in the synchronization sequence is taken to be 1. In order to allow for some variations in the signal that may arise due to compression or other forms of distortion, the index for either the maximum power or minimum power in a neighborhood is allowed to deviate by 1 from its expected value. For example, if a power maximum is found in the index $I_1$, and if the power minimum in the index $I_0$ neighborhood is found at $I_0-1$, instead of $I_0$, the next bit in the synchronization sequence is still taken to be 1. On the other hand, if a power minimum at $I_1$ and a power maximum at $I_0$ are detected using the same allowable variations discussed above, the next bit in the synchronization sequence is taken to be 0. However, if none of these conditions are satisfied, the output code is set to −1, indicating a sample block that cannot be decoded. Assuming that a 0 bit or a 1 bit is found, the second integer of the raw data member DA[1] in the raw data array DA is set to the appropriate value, and the next jump index JI of SIS[0] is incremented to 2, which corresponds to the third member of the hop sequence $H_S$. From this hop sequence number and the shift index used in encoding, the $I_1$ and $I_0$ indexes can be determined. Then, the neighborhoods of the $I_1$ and $I_0$ indexes are analyzed to locate maximums and minimums in the case of amplitude modulation so that the value of the next bit can be decoded from the third set of 64 block increments, and so on for fifteen such bits of the synchronization sequence. The fifteen bits stored in the raw data array DA may then be compared with a reference synchronization sequence to determine synchronization. If the number of errors between the fifteen bits stored in the raw data array DA and the reference synchronization sequence exceeds a previously set threshold, the extracted sequence is not acceptable as a synchronization, and the search for the synchronization sequence begins anew with a search for a triple tone.

If a valid synchronization sequence is thus detected, there is a valid synchronization, and the PN15 data sequences may then be extracted using the same analysis as is used for the synchronization sequence, except that detection of each PN15 data sequence is not conditioned upon detection of the triple tone which is reserved for the synchronization sequence. As each bit of a PN15 data sequence is found, it is inserted as a corresponding integer of the raw data array DA. When all integers of the raw data array DA are filled, (i) these integers are compared to each of the thirty-two possible PN15 sequences, (ii) the best matching sequence indicates which 5-bit number to select for writing into the appropriate array location of the output data array OP, and (iii) the group counter GC member is incremented to indicate that the first PN15 data sequence has been successfully extracted. If the group counter GC has not yet been incremented to 10 as determined at the processing stage 120, program flow returns to the processing stage 112 in order to decode the next PN15 data sequence.

When the group counter GC has incremented to 10 as determined at the processing stage 120, the output data array OP, which contains a full 50-bit message, is read at a processing stage 122. The total number of samples in a message block is 45,056 at a half-rate sampling frequency of 24 kHz. It is possible that several adjacent elements of the status information array SIS, each representing a message block separated by four samples from its neighbor, may lead to the recovery of the same message because synchronization may occur at several locations in the audio stream which are close to one another. If all these messages are identical, there is a high probability that an error-free code has been received.

Once a message has been recovered and the message has been read at the processing stage 122, the previous condition status PCS of the corresponding SIS element is set to 0 at a processing stage 124 so that searching is resumed at a processing stage 126 for the triple tone of the synchronization sequence of the next message block.

Multi-Level Coding

Often there is a need to insert more than one code message into the same audio stream. For example in a television program distribution environment, the network originator of the program may insert its identification code and time stamp, and a network affiliated station carrying this program may also insert its own identification code. In addition, an advertiser or sponsor may wish to have its code added. It is noted that the network originator, the network affiliated station, and the advertiser are at different distribution levels between audio origination and audio reception by the consumer. There are a number of methods of accommodating multi-level encoding in order to designate more than one distributor of the audio.

(i) Bit Reservation

In order to accommodate multi-level coding, 48 bits in a 50-bit system can be used for the code and the remaining 2 bits can be used for level specification. Usually the first program material generator, say the network, will insert codes in the audio stream. Its first message block would have the level bits set to 00, and only a synchronization sequence and the 2 level bits are set for the second and third message blocks in the case of a three level system. For example, the level bits for the second and third messages may be both set to 11 indicating that the actual data areas have been left unused.

The network affiliated station can now enter its code with a decoder/encoder combination that would locate the synchronization of the second message block with the 11 level setting. This station inserts its code in the data area of this block and sets the level bits to 01. The next level encoder inserts its code in the third message block's data area and sets the level bits to 10. During decoding, the level bits distinguish each message level category.

(ii) Frequency Multiplexing

In frequency multiplexing, each code level (e.g., network, affiliate, advertiser) is assigned to a different frequency band in the spectrum. In determining the size of a frequency band and, therefore, the number of bands that may be coded, it is noted that each code level generally requires a minimum of eighteen consecutive spectral lines when using the coding methods described herein. This requirement follows from the way in which a triple tone is coded. That is, in coding a triple tone, the frequencies corresponding to indices $I_1$, $I_0$, and $I_{mid}$ are all amplified. Because $I_1$=forty-eight and $I_0$=sixty-two, the two outer frequencies corresponding to $I_1$ and $I_0$ are separated by fourteen spectral lines. In addition, the neighborhoods defined for these frequencies extend two spectral lines on either side of these two frequencies for a total of eighteen spectral lines.

At a sampling rate of 48 kHz and 512 samples per block, eighteen spectral lines correspond to a spectral width of 1.69 kHz. In order to insert a code, there must be enough energy within this 1.69 kHz band to provide masking for the code signal. Three levels of code can be inserted in an audio signal typically having a bandwidth of 8 kHz by choosing the following bands: 2.9 kHz to 4.6 kHz for a first level of coding; 4.6 kHz to 6.3 kHz for a second level of coding; and, 6.3 kHz to 8.0 kHz for a third level of coding. However, it should be noted that audio consisting of speech usually has a bandwidth lower than 5 kHz and may, therefore, support only a single level of code.

(iii) Primary/Secondary Encoding

In this method of encoding, two types of encoders, a primary encoder and one or more secondary encoders, may be used to insert different levels of code. The various levels of code can be arranged hierarchically in such a manner that the primary encoder inserts at least the synchronization sequence and may also insert one of the levels, such as the highest level, of code. During encoding, and preferably prior to insertion of the synchronization sequence, the primary encoder leaves a predetermined number of audio blocks uncoded to permit the secondary encoders to insert their assigned levels of code. Accordingly, the secondary encoders have the capability to both decode and encode audio such that they first locate the synchronization sequence inserted by the primary encoder, and then determine their assigned positions in the audio stream for insertion of their corresponding codes. In the decoding process, the synchronization sequence is first detected, and then the several levels of codes are recovered sequentially.

Code Erasure and Overwrite

It may also be necessary to provide a means of erasing a code or to erase and overwrite a code. Erasure may be accomplished by detecting the triple tone/synchronization sequence using a decoder and by then modifying at least one of the triple tone frequencies such that the code is no longer recoverable. Overwriting involves extracting the synchronization sequence in the audio, testing the data bits in the data area and inserting a new bit only in those blocks that do not have the desired bit value. The new bit is inserted by amplifying and attenuating appropriate frequencies in the data area.

Delay Compensation

In a practical implementation of the encoder 12, $N_C$ samples of audio, where $N_C$ is typically 512, are processed at any given time. In order to achieve operation with a minimum amount of throughput delay, the following four buffers are used: input buffers IN0 and IN1, and output buffers OUT0 and OUT1. Each of these buffers can hold $N_C$ samples. While samples in the input buffer IN0 are being processed, the input buffer IN1 receives new incoming samples. The processed output samples from the input buffer IN0 are written into the output buffer OUT0, and samples previously encoded are written to the output from the output buffer OUT1. When the operation associated with each of these buffers is completed, processing begins on the samples stored in the input buffer IN1 while the input buffer IN0 starts receiving new data. Data from the output buffer OUT0 are now written to the output. This cycle of switching between the pair of buffers in the input and output sections of the encoder continues as long as new audio samples arrive for encoding. It is clear that a sample arriving at the input suffers a delay equivalent to the time duration required to fill two buffers at the sampling rate of 48 kHz before its encoded version appears at the output. This delay is approximately 22 ms. When the encoder 12 is used in a television system environment, it is necessary to compensate for this delay in order to maintain synchronization between video and audio.

Figure 9:
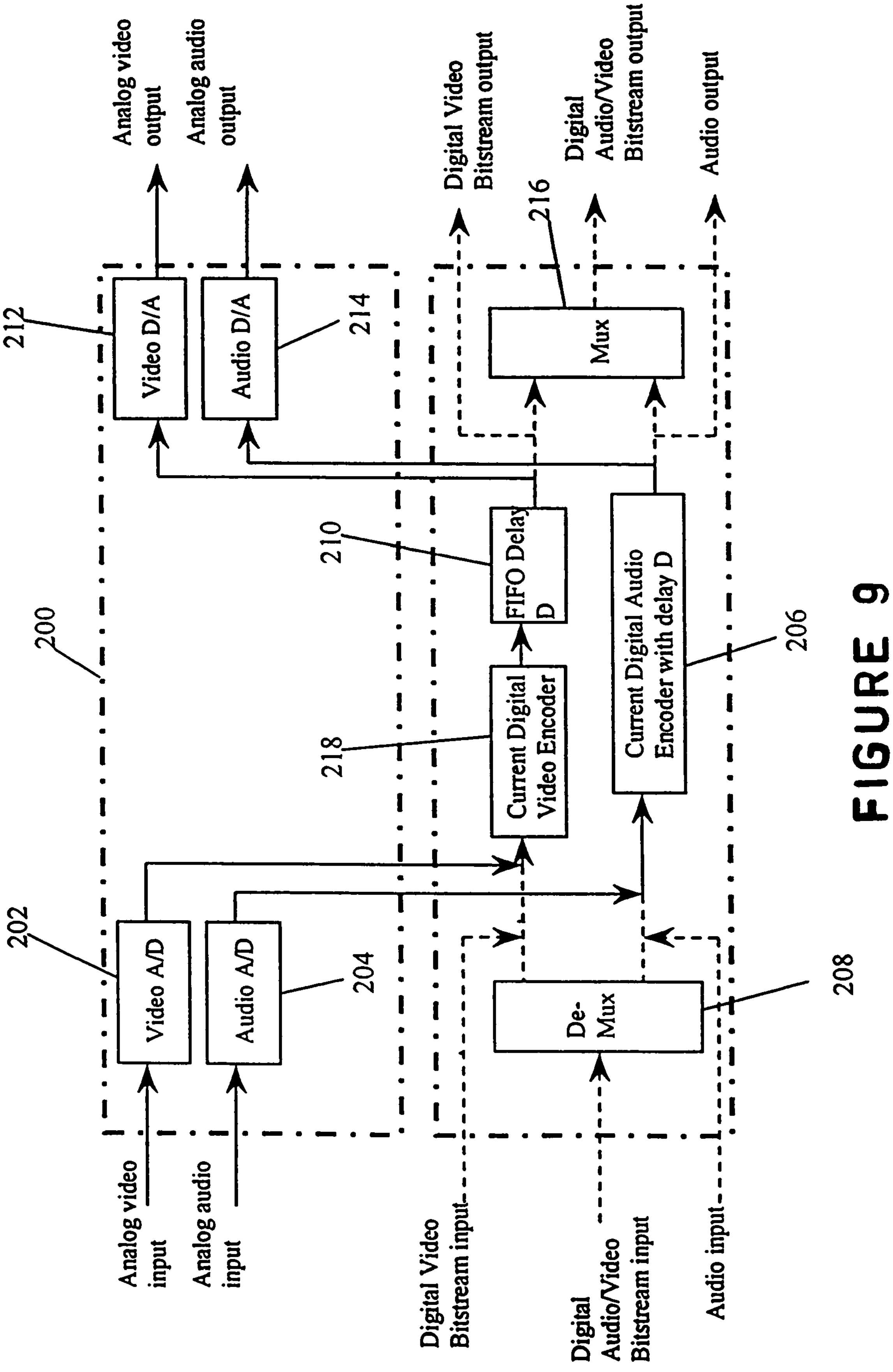
Figure 10:
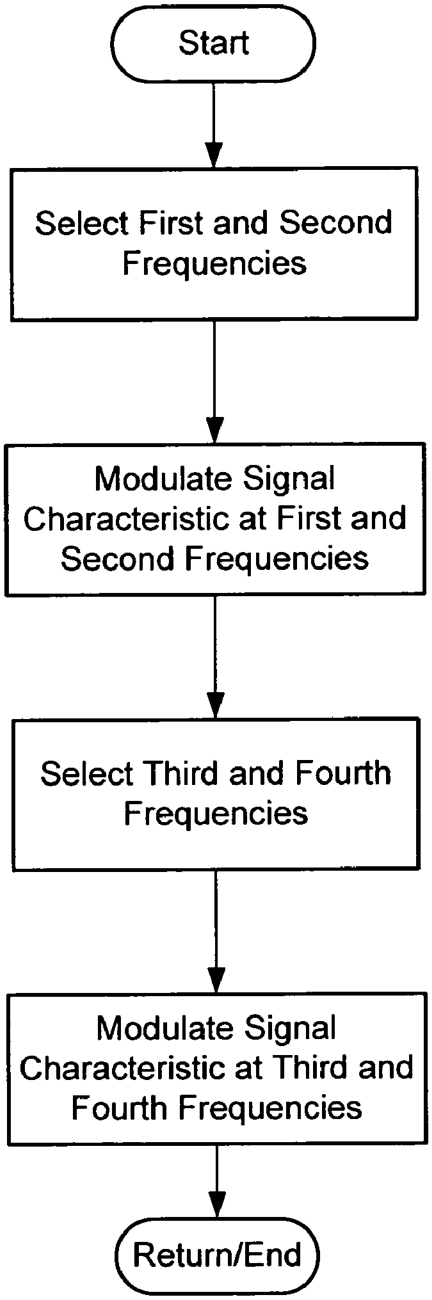
FIG. 10 is a flow diagram depicting an example manner in which information associated with an audio signal may be encoded.
Figure 11:
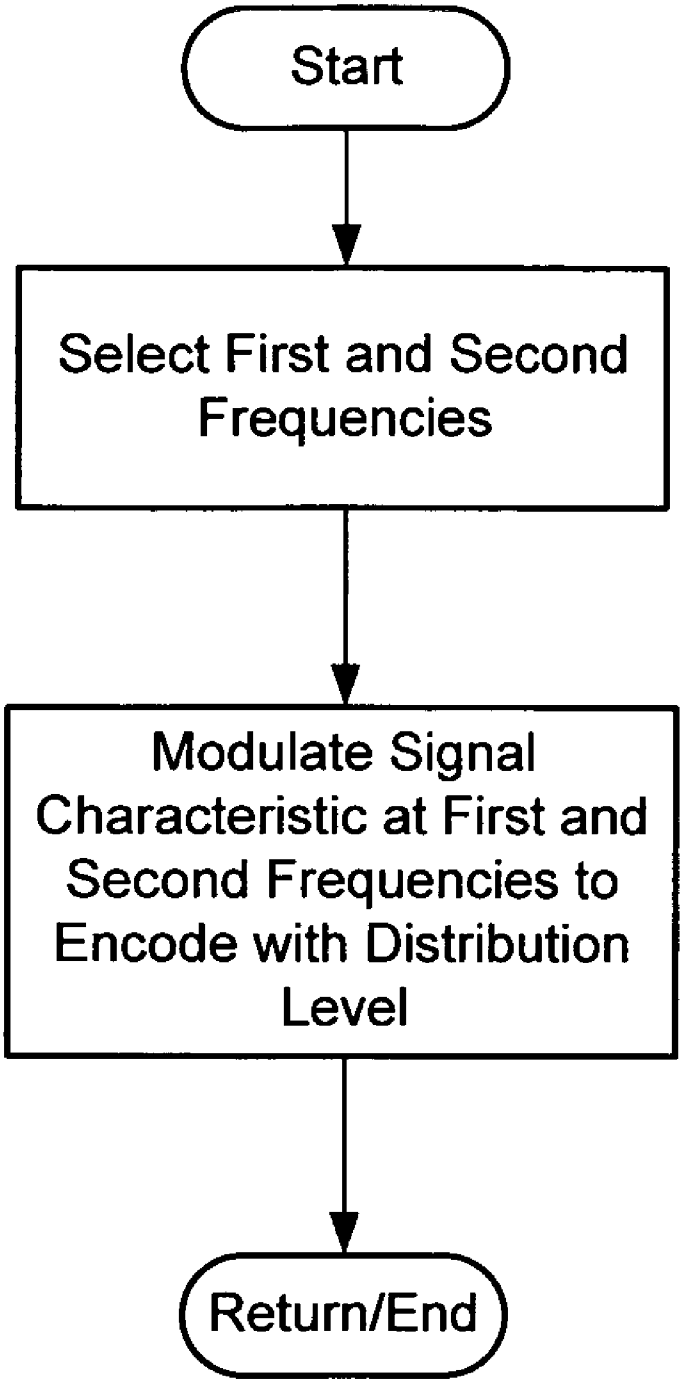
FIG. 11 is a flow diagram depicting an example manner in which information associated with audio may be encoded to include distribution level information.
Figure 12:
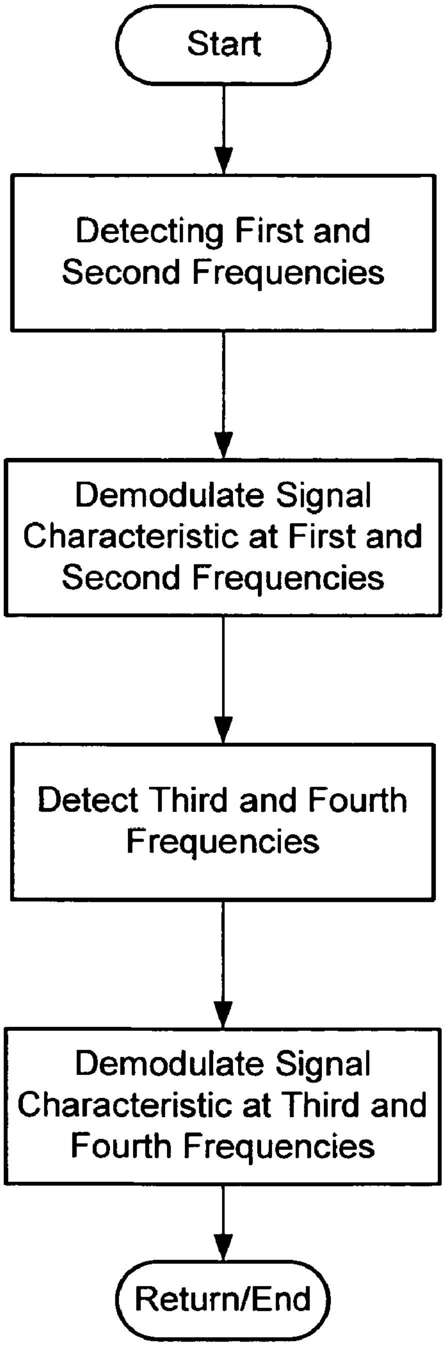
FIG. 12 is a flow diagram depicting an example manner in which encoded information may be recovered from an audio signal.
Figure 13:
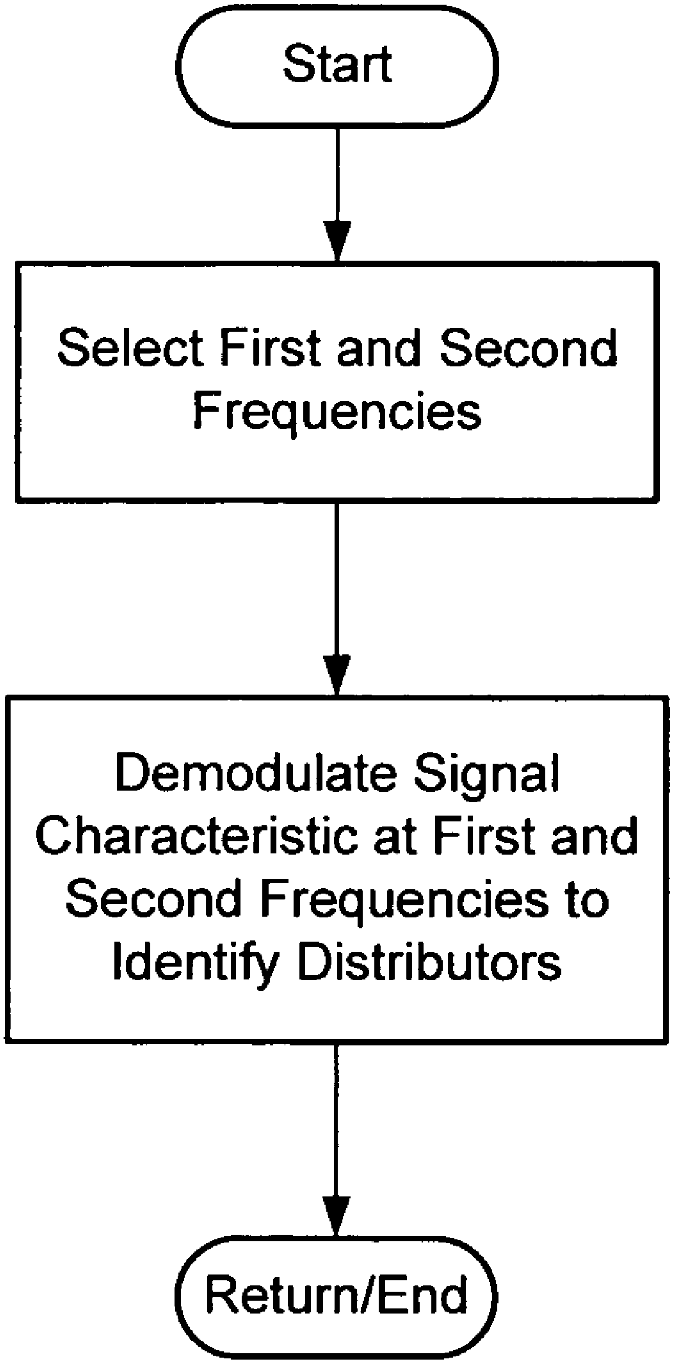
FIG. 13 is a flow diagram depicting an example manner in which information associated with distribution levels may be recovered from an audio signal.

Such a compensation arrangement is shown in FIG. 9. As shown in FIG. 9, an encoding arrangement 200, which may be used for the elements 12, 14, and 18 in FIG. 1, is arranged to receive either analog video and audio inputs or digital video and audio inputs. Analog video and audio inputs are supplied to corresponding video and audio analog to digital converters 202 and 204. The audio samples from the audio analog to digital converter 204 are provided to an audio encoder 206 which may be of known design or which may be arranged as disclosed above. The digital audio input is supplied directly to the audio encoder 206. Alternatively, if the input digital bit stream is a combination of digital video and audio bit stream portions, the input digital bit stream is provided to a demultiplexer 208 which separates the digital video and audio portions of the input digital bit stream and supplies the separated digital audio portion to the audio encoder 206.

Because the audio encoder 206 imposes a delay on the digital audio bit stream as discussed above relative to the digital video bit stream, a delay 210 is introduced in the digital video bit stream. The delay imposed on the digital video bit stream by the delay 210 is equal to the delay imposed on the digital audio bit stream by the audio encoder 206. Accordingly, the digital video and audio bit streams downstream of the encoding arrangement 200 will be synchronized.

In the case where analog video and audio inputs are provided to the encoding arrangement 200, the output of the delay 210 is provided to a video digital to analog converter 212 and the output of the audio encoder 206 is provided to an audio digital to analog converter 214. In the case where separate digital video and audio bit streams are provided to the encoding arrangement 200, the output of the delay 210 is provided directly as a digital video output of the encoding arrangement 200 and the output of the audio encoder 206 is provided directly as a digital audio output of the encoding arrangement 200. However, in the case where a combined digital video and audio bit stream is provided to the encoding arrangement 200, the outputs of the delay 210 and of the audio encoder 206 are provided to a multiplexer 216 which recombines the digital video and audio bit streams as an output of the encoding arrangement 200.

As explained above, there may be some instances where the arrangement described above can result in undesirable audibility of the ancillary code inserted into a program audio signal. Two such instances and exemplary solutions to these two instances are described below.

Controlling Code Audibility Using an Audio Quality Measure (AQM)

One example of audio material that is difficult to inaudibly encode is instrumental music characterized by strong harmonics or by a strong fundamental frequency in the code frequency band. Shifting the frequency maxima and minima in such cases can lead to audible distortion. Therefore, an audibility score, which is designated herein as the audio quality measure (AQM), can be computed in order to determine when instances of potentially audible code segments occur.

AQM computation may be based on psycho-acoustic models that are widely used in audio compression algorithms such as Dolby's AC-3, MPEG-2 Layers I, II, or III, or MPEG-AAC. The AQM computation discussed below is based on MPEG-AAC. However, the AQM computation may be based any of these audio compression algorithms. (For example, in the Dolby AC-3 audio compression method, a Modified Discrete Cosine Transform (MDCT) spectrum is used for computing the masking levels.)

Let it be assumed that blocks of 512 samples at a 48 kHz sampling rate are used to compute the AQM. The frequency space extending from 0 to 24 kHz is divided into 42 critical bands. Prior to encoding a block of audio as described above, the spectral energy $E_0[b]$ in each critical band, where b is the band index, is computed by the encoder 12 at the step 48 in accordance with the following equation:

$$E_0[b] = \sum_{f=fi}^{f=fl} A^2[f] \tag{18}$$

where A[f] is the amplitude at a frequency component f in the corresponding critical band of the audio block, fi is the initial frequency component in the corresponding critical band of the audio block, and f1 is the last frequency component in the corresponding critical band of the audio block.

A masking energy level $E_{MASK}[b]$ is also computed at the step 48 following the methodology described in ISO/IEC 13818-7:1997. The masking energy level $E_{MASK}[b]$ is the minimum change in energy within the band b that will be perceptible to the human ear.

If this block were to be coded by the spectral modulation procedure described earlier in this application, a new energy level value $E_C[b]$ for each band in the coded block will result and can be computed at the step 48 using equation (18).

The encoder 12 at the step 56 determines whether the change in energy of a band b given by $|E_C[b]-E_0[b]|$ is less than the masking energy level $E_{MASK}[b]$. If $|E_C[b]-E_0[b]|$ is less than $E_{MASK}[b]$, it can be assumed that there is adequate masking energy available in the band b to make the change resulting from coding imperceptible. Therefore, an aqm[b] for this band b is assumed to be zero. However, if $|E_C[b]-E_0[b]| \geqq E_{MASK}[b]$ for the band b, the aqm for the band can be computed at the step 56 as follows:

$$aqm[b] = \frac{|E_C[b] - E_0[b]|}{E_{MASK}[b]} \quad (19)$$

The total AQM score for the whole block can be obtained at the step 56 from equation (19) by summing across all 42 critical bands according to the following equation:

$$AQM_{TOTAL} = \sum_{b=0}^{b=41} aqm[b] \quad (20)$$

If it is determined at the step 56 that $AQM_{TOTAL}$ is greater than a predetermined threshold $AQM_{THRESH}$, then the corresponding block is not considered to be suitable for encoding.

In practice, however, coding of a single audio block, or even several audio blocks, whose $AQM_{TOTAL}>AQM_{THRESH}$ and whose durations are each approximately 10 ms, may not result in an audible code. But if one such audio block occurs, it is likely to occur near in time to other such audio blocks with the result that, if a sufficient number of such audio blocks are grouped consecutively in a sequence, coding of one or more audio blocks in the sequence may well produce an audible code thereby degrading the quality of the original audio.

Therefore, in order to determine when to encode and when to suspend encoding, the encoder 12 at the step 56 maintains a count of audible blocks. If x out of y consecutive blocks prior to the current block fall in the audible code category, then the encoder 12 at the step 56 suspends coding for all subsequent blocks of the current ancillary code message. If x is equal to 9 and y is equal to 16, for example, and if 9 out 16 such audio blocks are coded in spite of the audibility scores being high, an audible code is likely to result. Therefore, in order to successfully encode a 50 bit ancillary code message, a sequence of z audio blocks is required, where the sequence of z audio blocks has less than x audible blocks in any consecutive y block segment.

In addition, encoding of any individual audio block may be inhibited if the AQM score for this individual audio block exceeds a threshold $AQM_{THRESH}$+which is set higher than $AQM_{THRESH}$. Even though a single bit of code may be accordingly lost in such a case, the error correction discussed above will make it possible to still recover the ancillary code message.

Pre-Echo Cancellation

Pre-echo is a well known phenomenon that is encountered in most or all block based audio processing operations such as compression. It also occurs in the case of audio encoding as described above. Pre-echo arises when the audio energy within a block is not uniformly distributed, but is instead concentrated in the latter half of the block. Pre-echo effects are most apparent in the extreme case when the first half of the audio block has a very low level of audio and the second half of the audio block has a very high level of audio. As a result, a code signal, which is uniformly distributed across the entire audio block, has no masking energy available to make it inaudible during the first half of the audio block.

Therefore, each audio block, prior to coding at the step 56, is examined by the encoder 12 for the block's energy distribution characteristic. The energy in an audio block is computed by summing the squares of the amplitudes of the time domain samples. Then, if the ratio of the energy $E_1$ in a first part of the audio block to the energy $E_2$ in the remaining part of the audio block is below a threshold, a code is not inserted in the audio block. The energy $E_1$ and the energy $E_2$ are calculated according to the following equations:

$$E_1 = \sum_{s=o}^{s=d} A^2[s] \quad (21)$$

and $$E_2 = \sum_{s=d+1}^{s=S} A^2[s] \quad (22)$$

where A[s] is the amplitude of a sample s, S is the total number of samples in a corresponding block of audio, and d divides the corresponding block of audio between samples in the first part of the block of audio and samples in the remaining part of the block of audio. For example, d may divide the block of audio between samples in the first quarter of the block of audio and samples in the last three quarters of the block of audio.

Certain modifications of the present invention have been discussed above. Other modifications will occur to those practicing in the art of the present invention. For example, according to the description above, the encoding arrangement 200 includes a delay 210 which imposes a delay on the video bit stream in order to compensate for the delay imposed on the audio bit stream by the audio encoder 206. However, some embodiments of the encoding arrangement 200 may include a video encoder 218, which may be of known design, in order to encode the video output of the video analog to digital converter 202, or the input digital video bit stream, or the output of the demultiplexer 208, as the case may be. When the video encoder 218 is used, the audio encoder 206 and/or the video encoder 218 may be adjusted so that the relative delay imposed on the audio and video bit streams is zero and so that the audio and video bit streams are thereby synchronized. In this case, the delay 210 is not necessary. Alternatively, the delay 210 may be used to provide a suitable delay and may be inserted in either the video or audio processing so that the relative delay imposed on the audio and video bit streams is zero and so that the audio and video bit streams are thereby synchronized.

In still other embodiments of the encoding arrangement 200, the video encoder 218 and not the audio encoder 206 may be used. In this case, the delay 210 may be required in order to impose a delay on the audio bit stream so that the relative delay between the audio and video bit streams is zero and so that the audio and video bit streams are thereby synchronized.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies; and modulating the characteristic of the audio signal to form a second encoded block of information containing second information associated with the audio signal and information associated with the second code portion at each of the third and fourth frequencies, wherein modulating the characteristic of the audio signal includes increasing the spectral power at one of the first and second frequencies to render the spectral power at the one of the first and second frequencies a local maximum and decreasing the spectral power at the other of the first and second frequencies to render the spectral power at the other of the first and second frequencies a local minimum, and wherein modulating the audio signal includes increasing the spectral power at one of the third and fourth frequencies to render the spectral power at the one of the third and fourth frequencies a local maximum and decreasing the spectral power at the other of the third and fourth frequencies to render the spectral power at the other of the third and fourth frequencies a local minimum.

2. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies; and modulating the characteristic of the audio signal to form a second encoded block of information containing second information associated with the audio signal and information associated with the second code portion at each of the third and fourth frequencies, wherein modulating the characteristic of the audio signal includes selectively changing a phase relationship between the first and second frequencies, and wherein modulating the characteristic of the audio signal includes selectively changing a phase relationship between the third and fourth frequencies.

3. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies; and modulating the characteristic of the audio signal to form a second encoded block of information containing second information associated with the audio signal and information associated with the second code portion at each of the third and fourth frequencies, wherein modulating the characteristic of the audio signal includes swapping a spectral amplitude of at least one of the first and second frequencies with a spectral amplitude of a frequency having a maximum amplitude in a frequency neighborhood of the at least one of the first and second frequencies, and wherein modulating the characteristic of the audio signal includes swapping a spectral amplitude of at least one of the third and fourth frequencies with a spectral amplitude of a frequency having a maximum amplitude in a frequency neighborhood of the at least one of the third and fourth frequencies.

4. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies; and modulating the characteristic of the audio signal to form a second encoded block of information containing second information associated with the audio signal and information associated with the second code portion at each of the third and fourth frequencies, wherein the first and second frequencies are offset from the third and fourth frequencies based on a change in a low frequency maximum.

5. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies; and modulating the characteristic of the audio signal to form a second encoded block of information containing second information associated with the audio signal and information associated with the second code portion at each of the third and fourth frequencies, wherein the first and second frequencies are selected according to a reference frequency, a first low frequency maximum and a shift index.

6. The method of claim 5, wherein the first and second frequencies are selected based on an algebraic combination of an index associated with the reference frequency, an index associated with the first low frequency maximum, and the shift index.

7. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies; and modulating the characteristic of the audio signal to form a second encoded block of information containing second information associated with the audio signal and information associated with the second code portion at each of the third and fourth frequencies, wherein a synchronization block characterized by a triple tone portion is added to the audio signal.

8. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies;

modulating the characteristic of the audio signal to form a second encoded block of information containing second information associated with the audio signal and information associated with the second code portion at each of the third and fourth frequencies;

determining an audio quality measure for the first block of information; comparing the audio quality measure to a reference value; and inhibiting modulating the characteristic of the audio signal in response to the comparison of the audio quality measure and the reference value, wherein the audio quality measure is determined based on a first spectral energy associated with a block of information without coding, a second spectral energy associated with the block of information with coding, and a third spectral energy associated with a masking energy for the block of information.

9. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies;

modulating the characteristic of the audio signal to form a second encoded block of information containing second information associated with the audio signal and information associated with the second code portion at each of the third and fourth frequencies;

determining an audio quality measure for each of a plurality of blocks of information associated with the audio signal;

comparing the audio quality measure corresponding to each of the plurality of blocks of information to a reference value; and inhibiting modulating the characteristic of the audio signal if a predetermined portion of the plurality of blocks of information have an audio quality measure that exceeds the reference value, wherein inhibiting modulating the characteristic of the audio signal to prevent encoding of at least one of the plurality of blocks of information that has an audio quality measure exceeding a second predetermined reference value.

10. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies;

modulating the characteristic of the audio signal to form a second encoded block of information containing second information associated with the audio signal and information associated with the second code portion at each of the third and fourth frequencies;

determining an audio quality measure for each of a plurality of blocks of information associated with the audio signal;

comparing the audio quality measure corresponding to each of the plurality of blocks of information to a reference value; and inhibiting modulating the characteristic of the audio signal if a predetermined portion of the plurality of blocks of information have an audio quality measure that exceeds the reference value, wherein the audio quality measure is determined based on a first spectral energy associated with a block of information without coding, a second spectral energy associated with the block of information with coding, and a third spectral energy associated with a masking energy for the block of information.

11. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies; and modulating the characteristic of the audio signal to form a second encoded block of information containing second information associated with the audio signal and information associated with the second code portion at each of the third and fourth frequencies, wherein modulating the characteristic of the audio signal is inhibited based on a comparison of a first energy associated with a first portion of the first block of information and a second energy associated with a second portion of the first block of information.

12. The method of claim 11, wherein the first energy corresponds to energy in a first quarter of the first block of information and the second energy corresponds to energy in a last three quarters of the first block of information.

13. The method of claim 11, wherein the first and second blocks of information include frequency domain information associated with the audio signal.

14. The method of claim 13, wherein the first and second code portions correspond to respective first and second binary bits.

15. A method for encoding first and second blocks of information associated with at least a portion of an audio signal with corresponding first and second code portions, comprising:

selecting first and second frequencies from a frequency spectrum associated with the first block of information;

modulating a characteristic of the audio signal to form a first encoded block of information containing first information associated with the audio signal and information associated with the first code portion at each of the first and second frequencies, without substantially eliminating a portion of the audio signal at one of the first and second frequencies;

selecting third and fourth frequencies from a frequency spectrum associated with the second block of information, wherein the third and fourth frequencies are offset from the first and second frequencies;

modulating the characteristic of the audio signal to form a second encoded block of information containing second information associated with the audio signal and information associated with the second code portion at each of the third and fourth frequencies;

encoding, by use of a primary encoder, a group of blocks of information associated with the audio signal with a synchronization sequence, wherein the primary encoder leaves a predetermined number of groups of additional blocks of information associated with the audio signal unencoded;

encoding, by use of either the primary encoder or a secondary encoder, a first corresponding one of the groups of additional blocks of information associated with the audio signal to identify a first distributor of the audio signal; and encoding, by use of a secondary encoder, a second corresponding one of the groups of additional blocks of information associated with the audio signal to identify a second distributor of the audio.

16. A method of encoding blocks of audio information, comprising:

encoding each of the blocks of audio information by modulating a characteristic of the audio within the corresponding block of audio information at selected first and second frequencies to indicate first and second levels of distribution without substantially eliminating a portion of the audio at one of the first and second frequencies, wherein at least some of the blocks of audio information are encoded to contain distribution level information and audio signal information at each of the selected first and second frequencies, wherein the selected first and second frequencies change from a first one of the blocks of audio information to a second one of the blocks of audio information, wherein encoding each of the blocks of audio information includes encoding a plurality of the blocks of audio information with binary code bits such that some of the binary code bits are associated with a distribution level of encoding, and wherein a plurality of the blocks of audio information are set aside for encoding by a plurality of distributors of audio information, and wherein a predetermined combination of code bits within the plurality of blocks of audio information indicates audio information that has not been encoded by one or more of the plurality of distributors.

17. A method of encoding blocks of audio information, comprising:

encoding each of the blocks of audio information by modulating a characteristic of the audio within the corresponding block of audio information at selected first and second frequencies to indicate first and second levels of distribution without substantially eliminating a portion of the audio at one of the first and second frequencies, wherein at least some of the blocks of audio information are encoded to contain distribution level information and audio signal information at each of the selected first and second frequencies, and wherein the selected first and second frequencies change from a first one of the blocks of audio information to a second one of the blocks of audio information;

encoding, by use of a primary encoder, a first group of the blocks of audio information with a synchronization sequence, wherein the primary encoder leaves at least second and third groups of the blocks of audio information unencoded;

encoding the second group of the blocks of audio information to identify a first distributor of the audio information; and encoding the third group of the blocks of audio information to identify a second distributor of the audio information.

18. The method of claim 17, wherein the first and second groups of the blocks of audio information are the same group of the blocks of audio information.

19. The method of claim 17, wherein the second group of the blocks of audio information is encoded by the primary encoder.

20. A method of encoding blocks of audio information, comprising:

encoding each of the blocks of audio information by modulating a characteristic of the audio within the corresponding block of audio information at selected first and second frequencies to indicate first and second levels of distribution without substantially eliminating a portion of the audio at one of the first and second frequencies, wherein at least some of the blocks of audio information are encoded to contain distribution level information and audio signal information at each of the selected first and second frequencies, and wherein the selected first and second frequencies change from a first one of the blocks of audio information to a second one of the blocks of audio information, wherein encoding each of the blocks of audio information includes:

increasing the spectral power at one of the first and second frequencies of each block of audio information to render the spectral power at the one of the first and second frequencies a local maximum; and decreasing the spectral power at the other of the first and second frequencies of each block of audio information to render the spectral power at the other of the first and second frequencies a local minimum.

21. A method of encoding blocks of audio information, comprising:

encoding each of the blocks of audio information by modulating a characteristic of the audio within the corresponding block of audio information at selected first and second frequencies to indicate first and second levels of distribution without substantially eliminating a portion of the audio at one of the first and second frequencies, wherein at least some of the blocks of audio information are encoded to contain distribution level information and audio signal information at each of the selected first and second frequencies, and wherein the selected first and second frequencies change from a first one of the blocks of audio information to a second one of the blocks of audio information, wherein encoding each of the blocks of audio information includes selectively changing a phase relationship between the first and second frequencies in each of the blocks of audio information.

22. A method of encoding blocks of audio information, comprising:

encoding each of the blocks of audio information by modulating a characteristic of the audio within the corresponding block of audio information at selected first and second frequencies to indicate first and second levels of distribution without substantially eliminating a portion of the audio at one of the first and second frequencies, wherein at least some of the blocks of audio information are encoded to contain distribution level information and audio signal information at each of the selected first and second frequencies, and wherein the selected first and second frequencies change from a first one of the blocks of audio information to a second one of the blocks of audio information, wherein encoding each of the blocks of audio information includes swapping, in each of the blocks of audio information, a spectral amplitude of at least one of the first and second frequencies with a spectral amplitude of a frequency having a maximum amplitude in a frequency neighborhood of the at least one of the first and second frequencies.

23. A method of encoding blocks of audio information, comprising:

encoding each of the blocks of audio information by modulating a characteristic of the audio within the corresponding block of audio information at selected first and second frequencies to indicate first and second levels of distribution without substantially eliminating a portion of the audio at one of the first and second frequencies, wherein at least some of the blocks of audio information are encoded to contain distribution level information and audio signal information at each of the selected first and second frequencies, and wherein the selected first and second frequencies change from a first one of the blocks of audio information to a second one of the blocks of audio information, wherein the first and second frequencies change based on low frequency maxima.

24. A method of encoding blocks of audio information, comprising:

encoding each of the blocks of audio information by modulating a characteristic of the audio within the corresponding block of audio information at selected first and second frequencies to indicate first and second levels of distribution without substantially eliminating a portion of the audio at one of the first and second frequencies, wherein at least some of the blocks of audio information are encoded to contain distribution level information and audio signal information at each of the selected first and second frequencies, wherein the selected first and second frequencies change from a first one of the blocks of audio information to a second one of the blocks of audio information, and wherein a synchronization block characterized by a triple tone portion is added to the audio information.

25. A method for decoding first and second blocks of audio information associated with at least a portion of an audio signal to recover corresponding first and second code portions therefrom, comprising:

detecting first and second frequencies from a frequency spectrum associated with the first block of audio information;

demodulating a characteristic of the audio signal at the first and second frequencies to recover the first code portion from the first block of audio information, wherein the first block of audio information contains information associated with the audio signal and information associated with the first code portion encoded at each of the first and second frequencies without substantially eliminating a portion of the audio signal at one of the first and second frequencies;

detecting third and fourth frequencies from a frequency spectrum associated with the second block of audio information, wherein the third and fourth frequencies are offset from the first and second frequencies; and demodulating a characteristic of the audio signal at the third and fourth frequencies to recover the second code portion from the second block of audio information, wherein the second block of audio information contains information associated with the audio signal and information associated with the second code portion at each of the third and fourth frequencies, wherein demodulating the characteristic of the audio signal at the first and second frequencies includes demodulating the first and second frequencies so that the first code portion has a value dependent upon which of the first and second frequencies is a local maximum and which of the first and second frequencies is a local minimum; and wherein demodulating the characteristic of the audio signal at the third and fourth frequencies includes demodulating the third and fourth frequencies so that the second code portion has a value dependent upon which of the third and fourth frequencies is a local maximum and which of the third and fourth frequencies is a local minimum.

26. A method for decoding first and second blocks of audio information associated with at least a portion of an audio signal to recover corresponding first and second code portions therefrom, comprising:

detecting first and second frequencies from a frequency spectrum associated with the first block of audio information;

demodulating a characteristic of the audio signal at the first and second frequencies to recover the first code portion from the first block of audio information, wherein the first block of audio information contains information associated with the audio signal and information associated with the first code portion encoded at each of the first and second frequencies without substantially eliminating a portion of the audio signal at one of the first and second frequencies;

detecting third and fourth frequencies from a frequency spectrum associated with the second block of audio information, wherein the third and fourth frequencies are offset from the first and second frequencies; and demodulating a characteristic of the audio signal at the third and fourth frequencies to recover the second code portion from the second block of audio information, wherein the second block of audio information contains information associated with the audio signal and information associated with the second code portion at each of the third and fourth frequencies, wherein demodulating the characteristic of the audio signal at the first and second frequencies includes demodulating the first and second frequencies based on a phase relationship between the first and second frequencies, and wherein demodulating the characteristic of the audio signal at the third and fourth frequencies includes demodulating the third and fourth frequencies based on a phase relationship between the third and fourth frequencies.

27. A method for decoding first and second blocks of audio information associated with at least a portion of an audio signal to recover corresponding first and second code portions therefrom, comprising:

detecting first and second frequencies from a frequency spectrum associated with the first block of audio information;

demodulating a characteristic of the audio signal at the first and second frequencies to recover the first code portion from the first block of audio information, wherein the first block of audio information contains information associated with the audio signal and information associated with the first code portion encoded at each of the first and second frequencies without substantially eliminating a portion of the audio signal at one of the first and second frequencies;

detecting third and fourth frequencies from a frequency spectrum associated with the second block of audio information, wherein the third and fourth frequencies are offset from the first and second frequencies; and demodulating a characteristic of the audio signal at the third and fourth frequencies to recover the second code portion from the second block of audio information, wherein the second block of audio information contains information associated with the audio signal and information associated with the second code portion at each of the third and fourth frequencies, wherein demodulating the characteristic of the audio signal at the first and second frequencies includes demodulating the first and second frequencies based on a swapping of a spectral amplitude of at least one of the first and second frequencies with a spectral amplitude of a frequency having a maximum amplitude in a frequency neighborhood of the least one of the first and second frequencies, and wherein demodulating the characteristic of the audio signal at the third and fourth frequencies includes demodulating the third and fourth frequencies based on a swapping of a spectral amplitude of at least one of the third and fourth frequencies with a spectral amplitude of a frequency having a maximum amplitude in a frequency neighborhood of the least one of the third and fourth frequencies.

28. A method for decoding first and second blocks of audio information associated with at least a portion of an audio signal to recover corresponding first and second code portions therefrom, comprising:

detecting first and second frequencies from a frequency spectrum associated with the first block of audio information;

demodulating a characteristic of the audio signal at the first and second frequencies to recover the first code portion from the first block of audio information, wherein the first block of audio information contains information associated with the audio signal and information associated with the first code portion encoded at each of the first and second frequencies without substantially eliminating a portion of the audio signal at one of the first and second frequencies;

detecting third and fourth frequencies from a frequency spectrum associated with the second block of audio information, wherein the third and fourth frequencies are offset from the first and second frequencies; and demodulating a characteristic of the audio signal at the third and fourth frequencies to recover the second code portion from the second block of audio information, wherein the second block of audio information contains information associated with the audio signal and information associated with the second code portion at each of the third and fourth frequencies, wherein the offset between the first and second frequencies and the third and fourth frequencies is determined by frequency hopping based on a change in a low frequency maximum.

29. A method for decoding first and second blocks of audio information associated with at least a portion of an audio signal to recover corresponding first and second code portions therefrom, comprising:

detecting first and second frequencies from a frequency spectrum associated with the first block of audio information;

demodulating a characteristic of the audio signal at the first and second frequencies to recover the first code portion from the first block of audio information, wherein the first block of audio information contains information associated with the audio signal and information associated with the first code portion encoded at each of the first and second frequencies without substantially eliminating a portion of the audio signal at one of the first and second frequencies;

detecting third and fourth frequencies from a frequency spectrum associated with the second block of audio information, wherein the third and fourth frequencies are offset from the first and second frequencies; and demodulating a characteristic of the audio signal at the third and fourth frequencies to recover the second code portion from the second block of audio information, wherein the second block of audio information contains information associated with the audio signal and information associated with the second code portion at each of the third and fourth frequencies, wherein the first and second frequencies are determined according to a reference frequency, a low frequency maximum and a shift index.

30. The method of claim 29, wherein the first and second frequencies are determined based on an algebraic combination of an index associated with the reference frequency, an index associated with the low frequency maximum and the shift index.

31. A method for decoding first and second blocks of audio information associated with at least a portion of an audio signal to recover corresponding first and second code portions therefrom, comprising:

detecting first and second frequencies from a frequency spectrum associated with the first block of audio information;

demodulating a characteristic of the audio signal at the first and second frequencies to recover the first code portion from the first block of audio information, wherein the first block of audio information contains information associated with the audio signal and information associated with the first code portion encoded at each of the first and second frequencies without substantially eliminating a portion of the audio signal at one of the first and second frequencies;

detecting third and fourth frequencies from a frequency spectrum associated with the second block of audio information, wherein the third and fourth frequencies are offset from the first and second frequencies;

demodulating a characteristic of the audio signal at the third and fourth frequencies to recover the second code portion from the second block of audio information, wherein the second block of audio information contains information associated with the audio signal and information associated with the second code portion at each of the third and fourth frequencies; and detecting a synchronization message from a plurality of blocks of audio information associated with the audio signal, wherein the synchronization message is characterized by a triple tone portion.

32. A method for decoding first and second blocks of audio information associated with at least a portion of an audio signal to recover corresponding first and second code portions therefrom, comprising:

detecting first and second frequencies from a frequency spectrum associated with the first block of audio information;

demodulating a characteristic of the audio signal at the first and second frequencies to recover the first code portion from the first block of audio information, wherein the first block of audio information contains information associated with the audio signal and information associated with the first code portion encoded at each of the first and second frequencies without substantially eliminating a portion of the audio signal at one of the first and second frequencies;

detecting third and fourth frequencies from a frequency spectrum associated with the second block of audio information, wherein the third and fourth frequencies are offset from the first and second frequencies;

demodulating a characteristic of the audio signal at the third and fourth frequencies to recover the second code portion from the second block of audio information, wherein the second block of audio information contains information associated with the audio signal and information associated with the second code portion at each of the third and fourth frequencies;

decoding a plurality of blocks of audio information to recover a plurality of code portions; and decoding one or more of the plurality of code portions to determine a distribution level of the audio information, wherein a particular combination of the one of more code portions indicates that a corresponding group of blocks of audio information has not been encoded by a distributor of the audio information.

33. A method of decoding blocks of audio information, comprising:

decoding each of the blocks of audio information to recover a corresponding code portion by demodulating a characteristic of the audio within the corresponding block of audio information at selected first and second frequencies to identify first and second distributors of audio information, wherein at least some of the blocks of audio information contain distribution level information and audio signal information encoded at each of the selected first and second frequencies without substantially eliminating a portion of the audio information at one of the first and second frequencies, and wherein the selected first and second frequencies change from a first block of audio information to a second block of audio information, wherein decoding each of the blocks of audio information includes decoding one or more of the code portions to determine a distribution level of encoding, and wherein a number of blocks of audio information are set aside for encoding by a same number of distributors of the audio information, and wherein decoding each of the blocks of audio information includes decoding a predetermined combination of the code portions to determine that a corresponding group of blocks of audio information has not been encoded by a distributor.

34. A method of decoding blocks of audio information, comprising:

decoding each of the blocks of audio information to recover a corresponding code portion by demodulating a characteristic of the audio within the corresponding block of audio information at selected first and second frequencies to identify first and second distributors of audio information, wherein at least some of the blocks of audio information contain distribution level information and audio signal information encoded at each of the selected first and second frequencies without substantially eliminating a portion of the audio information at one of the first and second frequencies, wherein the selected first and second frequencies change from a first block of audio information to a second block of audio information, and wherein decoding each of the blocks of audio information includes demodulating the first and second frequencies to recover a code having a value dependent upon which of the first and second frequencies is a local maximum and which of the first and second frequencies is a local minimum.

35. A method of decoding blocks of audio information, comprising:

decoding each of the blocks of audio information to recover a corresponding code portion by demodulating a characteristic of the audio within the corresponding block of audio information at selected first and second frequencies to identify first and second distributors of audio information, wherein at least some of the blocks of audio information contain distribution level information and audio signal information encoded at each of the selected first and second frequencies without substantially eliminating a portion of the audio information at one of the first and second frequencies, wherein the selected first and second frequencies change from a first block of audio information to a second block of audio information, and wherein demodulating the audio at the first and second frequencies includes recovering a code portion having a value dependent upon a phase relationship between the first and second frequencies.

36. A method of decoding blocks of audio information, comprising:

decoding each of the blocks of audio information to recover a corresponding code portion by demodulating a characteristic of the audio within the corresponding block of audio information at selected first and second frequencies to identify first and second distributors of audio information, wherein at least some of the blocks of audio information contain distribution level information and audio signal information encoded at each of the selected first and second frequencies without substantially eliminating a portion of the audio information at one of the first and second frequencies, wherein the selected first and second frequencies change from a first block of audio information to a second block of audio information, and wherein demodulating the audio at the first and second frequencies includes demodulating the first and second frequencies based on a swapping of a spectral amplitude of at least one of the first and second frequencies with a spectral amplitude of a frequency having a maximum amplitude in a frequency neighborhood of the least one of the first and second frequencies to recover a code.

37. A method of decoding blocks of audio information, comprising:

decoding each of the blocks of audio information to recover a corresponding code portion by demodulating a characteristic of the audio within the corresponding block of audio information at selected first and second frequencies to identify first and second distributors of audio information, wherein at least some of the blocks of audio information contain distribution level information and audio signal information encoded at each of the selected first and second frequencies without substantially eliminating a portion of the audio information at one of the first and second frequencies, wherein the selected first and second frequencies change from a first block of audio information to a second block of audio information, and wherein the first and second frequencies are changed based on low frequency maxima.

38. A method of decoding blocks of audio information, comprising:

decoding each of the blocks of audio information to recover a corresponding code portion by demodulating a characteristic of the audio within the corresponding block of audio information at selected first and second frequencies to identify first and second distributors of audio information, wherein at least some of the blocks of audio information contain distribution level information and audio signal information encoded at each of the selected first and second frequencies without substantially eliminating a portion of the audio information at one of the first and second frequencies, and wherein the selected first and second frequencies change from a first block of audio information to a second block of audio information; and decoding a synchronization message characterized by a triple tone portion.

39. A method of encoding a signal, comprising:

measuring a characteristic of the signal at a plurality of frequencies associated with the signal;

modulating the signal at one or more of the plurality of frequencies if the characteristic of the signal at the one or more of the plurality of frequencies is not one of a local minimum or a local maximum; and foregoing modulating the signal at the one or more of the plurality of frequencies if the characteristic of the signal at the one or more of the plurality of frequencies is one of the local minimum or the local maximum.

40. A method as defined in claim 39, wherein the characteristic of the signal is a spectral characteristic.

41. A method as defined in claim 39, wherein the characteristic of the signal is an amplitude or a power.

42. A method as defined in claim 39, wherein each of the plurality of frequencies is selected based on a frequency hop sequence.

43. A method as defined in claim 39, wherein the signal contains audio information.

* * * * *